(12) United States Patent
Goteti et al.

(10) Patent No.: US 12,106,364 B1
(45) Date of Patent: Oct. 1, 2024

(54) METHODS, SYSTEMS, AND MEDIA FOR PROVIDING A NETWORKING PLATFORM FOR DYNAMICALLY AGGREGATING AND ROUTING LOAN INQUIRIES

(71) Applicant: Crowdnetic Corporation, New York, NY (US)

(72) Inventors: Srikanth Goteti, Scarsdale, NY (US); Nathan Barber, Darien, CT (US); Alice Tera Cox, Brooklyn, NY (US); Peter Leffler, New York, NY (US)

(73) Assignee: Crowdnetic Corporation, New York, NY (US)

( * ) Notice: Subject to any disclaimer, the term of this patent is extended or adjusted under 35 U.S.C. 154(b) by 149 days.

(21) Appl. No.: 15/485,096

(22) Filed: Apr. 11, 2017

Related U.S. Application Data

(60) Provisional application No. 62/320,644, filed on Apr. 11, 2016.

(51) Int. Cl.
*G06Q 40/03* (2023.01)
*H04L 67/12* (2022.01)

(52) U.S. Cl.
CPC .............. *G06Q 40/03* (2023.01); *H04L 67/12* (2013.01)

(58) Field of Classification Search
CPC .............................. G06Q 40/025; H06L 67/12
(Continued)

(56) References Cited

U.S. PATENT DOCUMENTS 5,797,133 A * 8/1998 Jones ...................... G06Q 40/08
705/38
6,438,526 B1 * 8/2002 Dykes ..................... G06Q 40/08
705/37
(Continued)

FOREIGN PATENT DOCUMENTS

CA       2778955 A1 * 12/2012 ............. G06Q 40/00

OTHER PUBLICATIONS

Determinants of Default in P2P Lending (Year: 2015).*

*Primary Examiner* — David P Sharvin
*Assistant Examiner* — Gregory M James
(74) *Attorney, Agent, or Firm* — Byrne Poh LLP

(57) ABSTRACT

Methods, systems, and media for providing a networking platform for dynamically aggregating and routing loan inquiries are provided. In some embodiments, a method for connecting banks, member associations, retailers, and others to marketplace and other lenders is provided, the method comprising: receiving, from a plurality of referrer devices, a plurality of referred loan inquiries, wherein each of the plurality of referred loan inquiries includes a plurality of borrower attributes, and wherein each of the plurality of referred loan inquiries has a loan type; obtaining, from a network that connects the plurality of referrers with a plurality of credit providers, credit provider information associated with the plurality of credit providers, wherein the credit provider information includes relationship information with the plurality of referrers; determining, for each of the plurality of referred loan inquiries, a first set of credit provider devices from a plurality of credit provider devices based at least in part on relationship information; determining, from the first set of credit provider devices, a second set of credit provider devices from the network that connects the plurality of referrers with the plurality of credit providers based at least in part on the loan type associated with the (Continued)

referred loan inquiry and information relating to the referred loan inquiry; transmitting the referred loan inquiry to the second set of credit provider devices; and transmitting at least one loan offer to the referrer device associated with the referred loan inquiry in response to receiving the at least one loan offer from one of the second set of credit provider devices.

14 Claims, 28 Drawing Sheets

(58) Field of Classification Search
USPC .......................................................... 705/38
See application file for complete search history.

(56) References Cited

U.S. PATENT DOCUMENTS

| | | | | |
|---|---|---|---|---|
| 6,775,782 | B1* | 8/2004 | Buros | H04L 63/0823 |
| | | | | 713/156 |
| 7,444,302 | B2* | 10/2008 | Hu | G06Q 10/10 |
| | | | | 705/38 |
| 7,873,569 | B1* | 1/2011 | Cahn | G06Q 40/04 |
| | | | | 705/37 |
| 2001/0037287 | A1* | 11/2001 | Broadbent | G10L 15/26 |
| | | | | 705/38 |
| 2002/0161630 | A1* | 10/2002 | Kern | G06Q 30/0232 |
| | | | | 705/14.32 |
| 2004/0034592 | A1* | 2/2004 | Hu | G06Q 40/03 |
| | | | | 705/38 |
| 2005/0065871 | A1* | 3/2005 | Gerhart | G06Q 40/03 |
| | | | | 705/38 |
| 2005/0234814 | A1* | 10/2005 | Jones | G06Q 40/03 |
| | | | | 705/38 |
| 2006/0178983 | A1* | 8/2006 | Nice | G06Q 40/02 |
| | | | | 705/38 |
| 2007/0226128 | A1* | 9/2007 | Wiryawan | G06Q 40/03 |
| | | | | 705/38 |
| 2011/0112957 | A1* | 5/2011 | Ingram | G06Q 40/03 |
| | | | | 705/38 |
| 2011/0125632 | A1* | 5/2011 | Neel | G06Q 40/03 |
| | | | | 705/38 |
| 2012/0239444 | A1* | 9/2012 | Williams | G06Q 10/067 |
| | | | | 705/7.11 |
| 2013/0297488 | A1* | 11/2013 | Boyanov | G06Q 40/03 |
| | | | | 705/38 |
| 2015/0066740 | A1* | 3/2015 | DiCarlo | G06Q 40/04 |
| | | | | 705/38 |
| 2015/0339769 | A1* | 11/2015 | deOliveira | G06Q 40/03 |
| | | | | 705/38 |

* cited by examiner

Portfolio Distribution

○ Current Investments  ○ Original Investments  ○ Completed Investments

| Platform | Invested $ | Invested % | Secured $ | Secured % | Gross Rate % | Loss Rate % | Fees % | Net Rate % |
|---|---|---|---|---|---|---|---|---|
| platform5 | $48,741,059 | 12.8% | $48,741,059 | 19.5% | 17.2% | 2% | 1.9% | 13.3% |
| platform7 | $11,457,336 | 0.5% | $11,457,336 | 0.7% | 80.4% | 8.7% | 3% | 68.7% |
| platform9 | $10,315,208 | 0.1% | $10,315,208 | 0.2% | 13% | 0.5% | 0% | 12.5% |
| platform1 | $72,239,917 | 0.7% | $72,239,917 | 1.1% | 14.6% | 1.7% | 1% | 12.1% |
| platform11 | $72,999,000 | 20.6% | $72,999,000 | 31.5% | 12.4% | 0.5% | 0.3% | 11.5% |
| platform2 | $75,604,705 | 21.6% | $0 | 0% | 15.9% | 3.1% | 2.8% | 10% |
| platform10 | $65,100,000 | 18.2% | $65,100,000 | 27.7% | 21% | 0.5% | 6% | 14.5% |
| platform6 | $18,095,367 | 2.7% | $0 | 0% | 23.2% | 10% | 1% | 12.2% |
| platform13 | $13,288,907 | 1.1% | $13,288,907 | 1.7% | 14.7% | 1% | 1.3% | 12.4% |
| platform16 | $15,209,956 | 1.7% | $15,209,956 | 2.6% | 12% | 0.2% | 0% | 11.8% |
| platform17 | $12,217,617 | 0.7% | $12,217,617 | 1.1% | 12.3% | 1% | 0% | 11.3% |
| platform18 | $19,850,382 | 3.2% | $19,850,382 | 5% | 12% | 0.5% | 0% | 11.7% |
| platform19 | $26,594,485 | 5.5% | $26,594,485 | 8.3% | 26.4% | 4% | 2% | 20.4% |
| platform21 | $37,766,941 | 9.2% | $37,766,941 | 14% | 12% | 0.2% | 0% | 11.8% |
| platform22 | $14,069,452 | 1.3% | $14,069,452 | 2% | 12.1% | 0.1% | 0% | 12% |
| Cash: | | | | | | | | |
| Total: | $453,150,334 | 100% | $379,450,260 | 75.7% | 17.2% | 2% | 2.2% | 13% |

Investment Restrictions

| Investment Restrictions | Requirement | Actual Values |
|---|---|---|
| Loan Term | Maximum of 2 years | 1.5 years |
| Trade receivable term | Maximum of 270 days | 430.0 Days |
| Sub-category allocation | Maximum of 15% of GA | 14.0% Consumer 0 Unsec-USA |
| Platform allocation | Minimum of 15% of GA | 30.1% platform 2 |
| Secured loans | Minimum of 35% of GA | 40.5% |
| Debt instrument allocation for each loan | Maximum of 30% of GA | 10.6% platform 3 |
| Debt instrument allocation for each sub-category | Maximum of 20% of Sub-Cat Allocation | 15.0% USA |

| Portfolio Distribution | | | | | | | | | |
|---|---|---|---|---|---|---|---|---|---|
| Funded | | | | | | | | | Export Data |
| ● Current Investments ○ Original Investments ○ Completed Investments | | | | | | | | | |
| Platform | Invested $ | Invested % | Secured $ | Secured % | Gross Rate % | Loss Rate % | Fees % | Net Rate % | |
| platform5 | $48,741,059 | 12.8% | $48,741,059 | 19.5% | 17.2% | 2% | 1.9% | 13.3% | |
| platform7 | $11,457,336 | 0.5% | $11,457,336 | 0.7% | 80.4% | 8.7% | 3% | 68.7% | |
| platform9 | $10,315,208 | 0.1% | $10,315,208 | 0.2% | 13% | 0.5% | 0% | 12.5% | |
| platform1 | $72,239,917 | 0.7% | $72,239,917 | 1.1% | 14.8% | 1.7% | 1% | 12.1% | |
| platform11 | $72,699,000 | 20.6% | $72,699,000 | 31.5% | 12.4% | 0.5% | 0.3% | 11.6% | |
| platform2 | $75,604,705 | 21.6% | $0 | 0% | 15.9% | 3.1% | 2.8% | 10% | |
| platform10 | $55,100,000 | 18.2% | $55,100,000 | 27.7% | 21% | 0.5% | 6% | 14.5% | |
| platform8 | $18,095,367 | 2.7% | $0 | 0% | 23.2% | 10% | 1% | 12.2% | |
| platform13 | $13,288,907 | 1.1% | $13,288,907 | 1.7% | 14.7% | 1% | 1.3% | 12.4% | |
| platform16 | $15,209,958 | 1.7% | $15,209,958 | 2.6% | 12% | 0.2% | 0% | 11.8% | |
| platform17 | $12,217,817 | 0.7% | $12,217,817 | 1.1% | 12.3% | 1% | 0% | 11.3% | |
| platform18 | $19,850,382 | 3.2% | $19,850,382 | 5% | 12% | 0.3% | 0% | 11.7% | |
| platform19 | $28,594,485 | 5.5% | $28,594,485 | 3.3% | 26.4% | 4% | 2% | 20.4% | |
| platform21 | $37,766,941 | 9.2% | $37,766,941 | 14% | 12% | 0.2% | 0% | 11.8% | |
| platform22 | $14,069,452 | 1.3% | $14,069,452 | 2% | 12.1% | 0.1% | 0% | 12% | |
| Cash | | | | | | | | | |
| Total | $453,150,334 | 100% | $379,450,262 | 75.7% | 17.2% | 2% | 2.2% | 13% | |

☉ Current investments  ○ Original investments  ○ Completed investments

Portfolio Distribution by Sub Category                                    Export Data Investment $ by Sub-Categories

| Platform | Business LT Sec USA | Business ST Sec USA | Commercial Real Estate ST USA | MCA USA | MCA Int'l | Factoring USA | Business Equipment USA |
|---|---|---|---|---|---|---|---|
| platform5 | $30,000,000 | $3,000,000 | $15,000,000 | $2,000,000 | $0 | $0 | $0 |
| platform7 | $0 | $1,000,000 | $0 | $2,000,000 | $1,000,000 | $0 | $0 |
| platform9 | $0 | $0 | $0 | $0 | $0 | $2,000,000 | $0 |
| platform1 | $500,000 | $0 | $0 | $0 | $0 | $0 | $3,000,000 |
| platform11 | $0 | $0 | $20,000,000 | $0 | $0 | $0 | $0 |
| platform2 | $0 | $0 | $0 | $0 | $0 | $0 | $0 |
| platform10 | $0 | $0 | $0 | $0 | $0 | $0 | $0 |
| platform6 | $0 | $0 | $0 | $0 | $0 | $0 | $0 |
| platform13 | $0 | $0 | $0 | $0 | $0 | $4,000,000 | $0 |
| platform16 | $0 | $0 | $0 | $0 | $0 | $0 | $0 |
| platform17 | $0 | $0 | $0 | $0 | $0 | $0 | $0 |
| platform18 | $0 | $0 | $0 | $0 | $0 | $0 | $0 |
| platform19 | $0 | $0 | $0 | $0 | $0 | $0 | $0 |
| platform21 | $0 | $0 | $0 | $0 | $0 | $0 | $0 |
| platform22 | $0 | $0 | $0 | $0 | $0 | $0 | $0 |
| Total | $30,500,000 | $4,000,000 | $35,000,000 | $4,000,000 | $1,000,000 | $6,000,000 | $3,000,000 |
| % of Portfolio | 10.0% | 3.0% | 15.0% | 1.0% | 0.5% | 3% | 1.5% |

Key Statistics

📅 April 2016   📅 April 2017

[FinMkt Lending Fund I ⇵]   [Select Platform ⇵]   [Select Category ⇵]   [Select Sub-Category ⇵]   [Select Resolution ⇵]   [Export Data]

| Field | Apr-16 | May-16 | Jun-16 | Jul-16 | Aug-16 | Sep-16 | Oct-16 | Nov-16 | Dec-16 | Jan-17 |
|---|---|---|---|---|---|---|---|---|---|---|
| Rate | 15.00% | 12.00% | 18.00% | 19.00% | 10.00% | 20.00% | 18.99% | 16.00% | 22.00% | 10.00% |
| Credit | 0 | 0 | 0 | 0 | 0 | 0 | 0 | 0 | 0 | 0 |
| Whole % | 30.00% | 80.00% | 62.00% | 80.00% | 62.00% | 67.00% | 23.99% | 20.00% | 65.00% | 40.00% |
| Term Yrs | 2 | 3 | 1 | 5 | 3 | 1 | 2 | 1 | 5 | 3 |
| Avg Inv | $32,000 | $17,500 | $10,000 | $34,000 | $28,000 | $38,000 | $60,000 | $40,000 | $20,000 | $85,000 |
| Inv Amt | $20,000,000 | $10,000,000 | $12,000,000 | $19,000,000 | $34,000,000 | $46,000,000 | $20,000,000 | $60,000,000 | $10,000,000 | $40,000 |

METHODS, SYSTEMS, AND MEDIA FOR PROVIDING A NETWORKING PLATFORM FOR DYNAMICALLY AGGREGATING AND ROUTING LOAN INQUIRIES

CROSS-REFERENCE TO RELATED APPLICATIONS

This application claims the benefit of United States Provisional Patent Application No. 62/320,644, filed Apr. 11, 2016, which is hereby incorporated by reference herein in its entirety.

TECHNICAL FIELD

The disclosed subject matter relates to methods, systems, and media for providing a networking platform for connecting banks, member associations, retailers, and others to marketplace and other lenders. More particularly, the disclosed subject matter relates to providing a marketplace lending system that creates a network of financial institutions and non-financial institutions with alternative lenders (e.g., marketplace lending platforms, direct lending platforms, institutional investors, etc.) and uses the network to collect and route referred loan inquiries according to a set of detailed matching criteria.

BACKGROUND

In many instances, potential borrowers find it difficult to obtain a loan or obtain credit. This may be because such potential borrowers have, for example, no credit history, bad credit history, or unfavorable credit ratios, thereby making it difficult for borrowers to obtain funds. Further, traditional financial institutions have reduced loan exposure to both consumers and small businesses which has caused a decline in the amount of credit available to certain borrowers. Due to the recent economic downturn and increased capital requirements for banks, traditional lending institutions are much more cautious with extending credit, particularly to borrowers who have previously failed to meet loan obligations.

Lending funds involves capital management and exposure assessment, where exposure can vary based on a number of criteria. As such, a traditional financial institution generally evaluates the exposure associated with a potential borrower and approves or disapproves a lending request based on various criteria that indicate whether the exposure is acceptable. Accordingly, if a potential borrower is evaluated as having a likelihood of not being able to meet loan obligations, the traditional financial institution generally has little choice other than to disapprove the loan application or institute an approach to justify the exposure, such as applying a higher interest rate or increasing fees.

Faced with a challenging credit environment, some borrowers are turning to marketplace lenders, which allow individuals and entities to lend and borrow without the intermediation of a traditional financial institution. Typically, these loans are made over an online platform and can involve large numbers of lenders (individuals and institutions) to the same borrower.

However, a substantial issue for marketplace lending is the large number of borrowers who need capital but are unaware of this opportunity, which, in turn, affects all of the entities involved. For example, borrowers may be accustomed to traditional financing from traditional financial institutions and may have a lack of knowledge about alternatives, such as marketplace lending. In another example, financial institutions, such as banks, may lack the technology to integrate with marketplace lending platforms and may not want to work with each platform one-on-one to perform required integrations. More particularly, single platform, bilateral partnerships between banks and marketplace lending platforms provide a small number of new loan products and can be costly and time consuming to integrate even a single platform. Even further, the cost of acquiring borrowers is increasing among online lending platforms.

Accordingly, it is desirable to provide methods, systems, and media for providing a networking platform for dynamically aggregating and routing loan inquiries.

SUMMARY

Methods, systems, and media for providing a networking platform for dynamically aggregating and routing loan inquiries are provided.

In accordance with some embodiments of the disclosed subject matter, a method for connecting banks, member associations, retailers, and others to marketplace and other lenders is provided, the method comprising: receiving, from a plurality of referrer devices, a plurality of referred loan inquiries, wherein each of the plurality of referred loan inquiries includes a plurality of borrower attributes, and wherein each of the plurality of referred loan inquiries has a loan type; obtaining, from a network that connects the plurality of referrers with a plurality of credit providers, credit provider information associated with the plurality of credit providers, wherein the credit provider information includes relationship information with the plurality of referrers; determining, for each of the plurality of referred loan inquiries, a first set of credit provider devices from a plurality of credit provider devices based at least in part on relationship information; determining, from the first set of credit provider devices, a second set of credit provider devices from the network that connects the plurality of referrers with the plurality of credit providers based at least in part on the loan type associated with the referred loan inquiry and information relating to the referred loan inquiry; transmitting the referred loan inquiry to the second set of credit provider devices; and transmitting at least one loan offer to the referrer device associated with the referred loan inquiry in response to receiving the at least one loan offer from one of the second set of credit provider devices.

In some embodiments, the credit provider information includes borrower eligibility criteria and the method further comprises: selecting the first set of credit provider devices from the plurality of credit provider devices by determining whether the borrower information associated with the borrower in the referred loan inquiry meets the borrower eligibility criteria associated with a credit provider device.

In some embodiments, routing a referred loan inquiry to a credit provider device from the second set of credit provider devices further comprises: establishing a secure channel with the credit provider device; using a cryptographic protocol to encode the referred loan inquiry; and transmitting the encoded loan inquiry to the credit provider device, wherein the credit provider device has a key for decoding the encoded loan inquiry.

In some embodiments, the referred loan inquiry is at least one of: a consumer loan inquiry, a student loan inquiry, a small business loan inquiry, a real estate loan inquiry, and an automobile loan inquiry.

In some embodiments, the network includes at least a plurality of: banks, associations, retailers, marketplace lenders, asset managers, securitization originators, and investors.

In some embodiments, transmitting the referred loan inquiry to the second set of credit provider devices further comprises: determining whether each credit provider device from the second set of credit provider devices has received the referred loan inquiry; in response to determining that at least one credit provider device in the second set of credit provider devices has not received the referred loan inquiry, transmitting a request to the at least one credit provider device to obtain a referral application programming interface that is capable of receiving and displaying the referred loan inquiry; and providing the referral application programming interface based on a response to the request.

In some embodiments, the method further comprises: determining whether each credit provider device in the second set of credit provider devices has associated one or more application programming interfaces to receive and display the referred loan inquiry; and, in response to determining that at least one credit provider device in the second set of credit provider devices has not associated the one or more application programming interfaces to receive and display the referred loan inquiry, providing the at least one credit provider device with a referral application programming interface that is capable of receiving and displaying the referred loan inquiry.

In some embodiments, the method further comprises: receiving loan inquiry status information from the second set of credit provider devices, wherein a first credit provider device transmits the loan inquiry status information using a credit provider application programming interface and a second credit provider device transmits the loan inquiry status information using a provided reporting application programming interface; normalizing the received loan inquiry status information; and transmitting updates to a plurality of referral partner devices, wherein each of the plurality of referral partner devices is associated with one of a plurality of interfaces for receiving the updates in connection with loan inquiry status information.

In accordance with some embodiments of the disclosed subject matter, a system for connecting banks, member associations, retailers, and others to marketplace and other lenders is provided, the system comprising a hardware processor that is configured to: receive, from a plurality of referrer devices, a plurality of referred loan inquiries, wherein each of the plurality of referred loan inquiries includes a plurality of borrower attributes, and wherein each of the plurality of referred loan inquiries has a loan type; obtain, from a network that connects the plurality of referrers with a plurality of credit providers, credit provider information associated with the plurality of credit providers, wherein the credit provider information includes relationship information with the plurality of referrers; determine, for each of the plurality of referred loan inquiries, a first set of credit provider devices from a plurality of credit provider devices based at least in part on relationship information; determine, from the first set of credit provider devices, a second set of credit provider devices from the network that connects the plurality of referrers with the plurality of credit providers based at least in part on the loan type associated with the referred loan inquiry and information relating to the referred loan inquiry; transmit the referred loan inquiry to the second set of credit provider devices; and transmit at least one loan offer to the referrer device associated with the referred loan inquiry in response to receiving the at least one loan offer from one of the second set of credit provider devices.

In accordance with some embodiments of the disclosed subject matter, a non-transitory computer-readable medium containing computer executable instructions that, when executed by a processor, cause the processor to perform a method for dynamically aggregating and routing loan inquiries is provided, the method comprising: receiving, from a plurality of referrer devices, a plurality of referred loan inquiries, wherein each of the plurality of referred loan inquiries includes a plurality of borrower attributes, and wherein each of the plurality of referred loan inquiries has a loan type; obtaining, from a network that connects the plurality of referrers with a plurality of credit providers, credit provider information associated with the plurality of credit providers, wherein the credit provider information includes relationship information with the plurality of referrers; determining, for each of the plurality of referred loan inquiries, a first set of credit provider devices from a plurality of credit provider devices based at least in part on relationship information; determining, from the first set of credit provider devices, a second set of credit provider devices from the network that connects the plurality of referrers with the plurality of credit providers based at least in part on the loan type associated with the referred loan inquiry and information relating to the referred loan inquiry; transmitting the referred loan inquiry to the second set of credit provider devices; and transmitting at least one loan offer to the referrer device associated with the referred loan inquiry in response to receiving the at least one loan offer from one of the second set of credit provider devices.

In accordance with some embodiments of the disclosed subject matter, a system for dynamically aggregating and routing loan inquiries is provided, the system comprising: means for receiving, from a plurality of referrer devices, a plurality of referred loan inquiries, wherein each of the plurality of referred loan inquiries includes a plurality of borrower attributes, and wherein each of the plurality of referred loan inquiries has a loan type; means for obtaining, from a network that connects the plurality of referrers with a plurality of credit providers, credit provider information associated with the plurality of credit providers, wherein the credit provider information includes relationship information with the plurality of referrers; means for determining, for each of the plurality of referred loan inquiries, a first set of credit provider devices from a plurality of credit provider devices based at least in part on relationship information; means for determining, from the first set of credit provider devices, a second set of credit provider devices from the network that connects the plurality of referrers with the plurality of credit providers based at least in part on the loan type associated with the referred loan inquiry and information relating to the referred loan inquiry; means for transmitting the referred loan inquiry to the second set of credit provider devices; and means for transmitting at least one loan offer to the referrer device associated with the referred loan inquiry in response to receiving the at least one loan offer from one of the second set of credit provider devices.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 7 shows an illustrative user interface that can be presented to a credit provider device that allows a user at the credit provider device to sort and filter through individual loans in accordance with some embodiments of the disclosed subject matter.

FIG. 8A shows an illustrative user interface that can allow credit providers to manage multiple marketplace lending portfolios, where each credit provider can be provided with the opportunity to browse through listings, route orders, create portfolios, and analyze historical performance in accordance with some embodiments of the disclosed subject matter.

FIGS. 11-24 show illustrative interfaces that can be presented to a user using aggregated, mapped, and/or normalized loan information in accordance with some embodiments of the disclosed subject matter.

DETAILED DESCRIPTION

In accordance with various embodiments, mechanisms (which can include methods, systems, and media) for providing a networking platform for aggregating and dynamically routing loan inquiries are provided.

Figure 1:
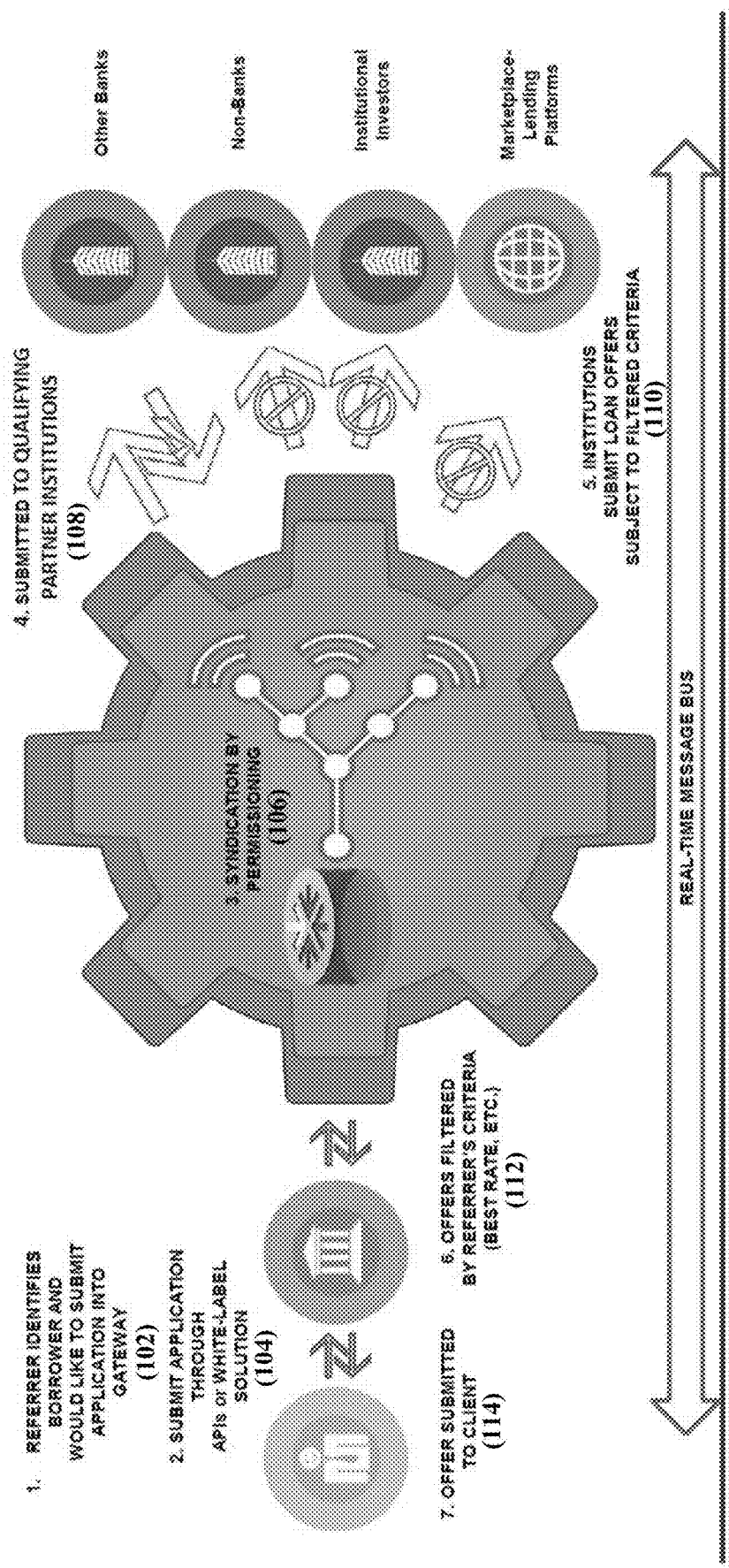
FIG. 1 shows a transactional flow diagram for providing a marketplace lending network platform that connects borrowers and banks or any other referral partners to investors and marketplace lending intermediaries in accordance with some embodiments of the disclosed subject matter.

FIG. 1 shows a transactional flow diagram for providing a marketplace lending network platform that connects borrowers and banks or any other referral partners to investors and marketplace lending intermediaries in accordance with some embodiments of the disclosed subject matter. The marketplace lending network platform can sometimes be referred to herein as a "marketplace lending gateway."

As shown in FIG. 1, a referrer device that can be associated with any suitable entity, such as a traditional financial institution, can identify a borrower having a loan inquiry for submission to the marketplace lending network platform at 102. For example, the referrer device can be associated with a referring financial institution, where the financial institution has rejected the loan application from the borrower and where the financial institution is interested in monetizing rejected loan applications or other loan turndowns by accessing a network of marketplace lenders. In another example, the referrer device can be associated with a borrower having a loan application that may have been rejected by traditional financial institutions and desiring access to credit that may otherwise not have been attainable. In yet another example, the referrer device can be associated with a referral partner that sourced a direct origination loan inquiry from the borrower.

It should be noted that the referred loan inquiry for transmission to the marketplace lending network platform can include any suitable information, such as borrower information, borrower credit history, loan information (e.g., loan amount, loan terms, etc.), loan type information (e.g., a student loan, an automobile loan, etc.), and referrer criteria (e.g., rate information, etc.). Any suitable information pertaining to the loan, the borrower, the referrer, the referrer device, and the entity associated with the referrer can be included with the referred loan inquiry.

In situations in which the systems described herein collect personal information about borrowers, or make use of personal information, the borrowers or the referrer devices that are referring loan inquiries from one or more borrowers may be provided with an opportunity to control whether programs or features collect borrower information (e.g., information about a borrower's profession, a borrower's preferences, or a borrower's current location). In addition, certain data may be treated in one or more ways before it is stored or used, so that personal information is removed. For example, borrower information and other information that can identify the borrower may be treated so that no personal information can be determined for the borrower. Thus, the borrower or an entity representing the borrower may have control over how information is collected about the borrower and used by a server.

At 104, the referred loan inquiry can be submitted to the marketplace lending network platform over a real-time message bus using an application programming interface (API) or any other suitable interface provided by the marketplace lending network platform. In some embodiments, the application programming interface provided by the marketplace lending network platform can be used for transmitting one or more loan inquiries from potential borrowers from a referrer device to the marketplace lending network platform. In some embodiments, the application programming interface provided by the marketplace lending network platform can be used to provide secure communications between referrer devices, the marketplace lending network platform, and one or more lending devices associated with entities providing loan offers to the borrowers associated with the referrer devices.

At 106, in response to submitting a referred loan inquiry to the marketplace lending network platform (e.g., using the application programming interface in 104), the marketplace lending network platform can analyze, and route the referred loan inquiry to one or more lending devices that are associated with qualifying partner institutions. These qualifying partner institutions can include, for example, other financial institutions, non-financial institutions, institutional investors, marketplace lending platforms, etc. Moreover, the marketplace lending network platform can generally include a network of approved referrers, other financial institutions, non-financial institutions, institutional investors, marketplace lending platforms, etc.

In response to indicating a subset of lending devices to receive the referred loan inquiry, the referred loan inquiry can be transmitted to the subset of lending devices over the real-time message bus at 108. As described herein, the marketplace lending network platform can be used for any suitable number of applications. For example, the marketplace lending network platform can be used to provide borrowers with access to credit that may otherwise not have been attainable. In another example, the marketplace lending network platform can be used to provide referrer devices, such as referring banks, with a mechanism for monetizing loan turndowns or rejected loan applications by providing access to a network of credit providers that includes multiple lending intermediaries and end investors. In yet another example, for traditional lenders and marketplace lending platforms, the marketplace lending network platform can be used to increase and/or stabilize borrower flow and provide access to additional customers to which to sell additional products. In a further example, for institutional investors, the marketplace lending network platform can be used to provide higher yields and securitization opportunities along with providing the opportunity to create new or additional products.

It should be noted that, in some embodiments, the marketplace lending network platform can supplement the referred loan inquiry with any suitable supplemental information. Supplemental information can include, for example, information about the referrer devices, information about the borrower obtained by or stored by the marketplace lending network platform that was not provided by the referrer device, information about the entity represented by the referrer device, supplemental loan criteria, etc.

In some embodiments, the marketplace lending network platform can include a knowledge base that has an information repository of credit providers and borrowers' eligibility criteria. For example, in response to registering with the marketplace lending network platform, the credit providers or borrowers can receive a request to provide credit information, such as credit history information, authorization to obtain credit-related information, prior lending experiences, prior loan terms, etc. In another example, in response to registering with the marketplace lending network platform, the credit providers or borrowers can receive a request to provide affirmative authorization to obtain such credit information, where the resulting credit information is associated with a profile of the credit provider or borrower.

In some embodiments, the marketplace lending network platform can include data analysis features that can be used to identify a subset of credit providers for receiving the referred loan inquiry. In a more particular example, the data analysis features can be used to identify the best N matching credit providers, where N can be limited to relationships and/or borrower experience.

In some embodiments, the marketplace lending network platform can include an entitlement system that maintains relationships between originators that are submitting referred loan inquiries to the marketplace lending network platform and intermediaries. For example, the entitlement system can manage the provided network of partner institutions including banks, non-banks, institutional investors, and marketplace lending platforms. In another example, the entitlement system can use various criteria to determine which referred loan inquiries are to be routed to particular credit providers or intermediaries in the network.

Referring back to FIG. 1, in response to transmitting the referred loan inquiry to a subset of selected lending devices (e.g., each associated with a credit provider), the marketplace lending network platform can receive loan offers from one or more of the selected lending devices via the real-time message bus at 110.

At 112, the marketplace lending network platform can aggregate the received loan offers that will be submitted to the referrer device. At 114, the loan offers can be transmitted using the real-time message bus to the appropriate referrer device associated with the respective loan inquiries.

At 116, in some embodiments, the marketplace lending network platform can provide borrower tracking and reporting features to the appropriate referrer device. For example, the marketplace lending network platform can aggregate, track, analyze, and/or normalize loan inquiry status information from multiple credit providers. In continuing with this example, the marketplace lending network platform can then provide customized reporting features to multiple referral partners.

These and other intelligent routing features performed by the marketplace lending network platform for referred loan inquiries including knowledge base features, data analysis features, and entitlement features are further described in connection with FIGS. 2-27.

Figure 2:
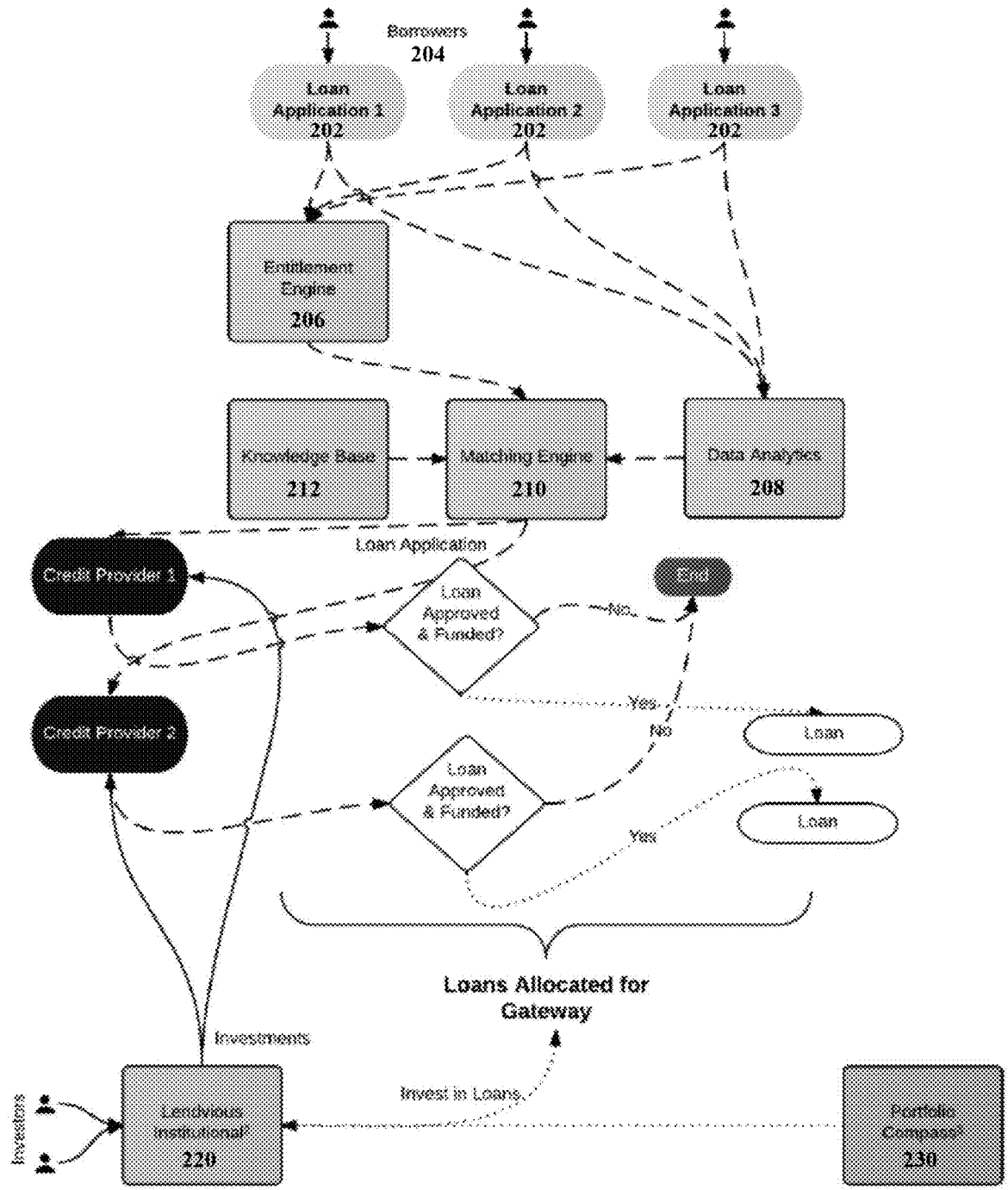
FIG. 2 shows an illustrative example of the marketplace lending network platform, where the marketplace lending network platform can also include investor tools, such as Lendvious Institutional and Portfolio Compass, that enable investors to view and select loans to fund and to monitor loan performance data after purchasing the loans, in accordance with some embodiments of the disclosed subject matter.

FIG. 2 shows an illustrative example of the marketplace lending network platform in accordance with some embodiments of the disclosed subject matter.

As shown in FIG. 2, the marketplace lending network platform can receive multiple loan inquiries 202 from multiple borrowers 204 (e.g., assisted by referrer devices). For example, as shown in more detail in FIG. 3, process 300 can begin by receiving multiple loan inquiries of varying loan types 302 (e.g., consumer loan inquiries, student loan inquiries, and small business loan inquiries) via an application programming interface or any other suitable interface to the marketplace lending network platform at 304.

Figure 3:
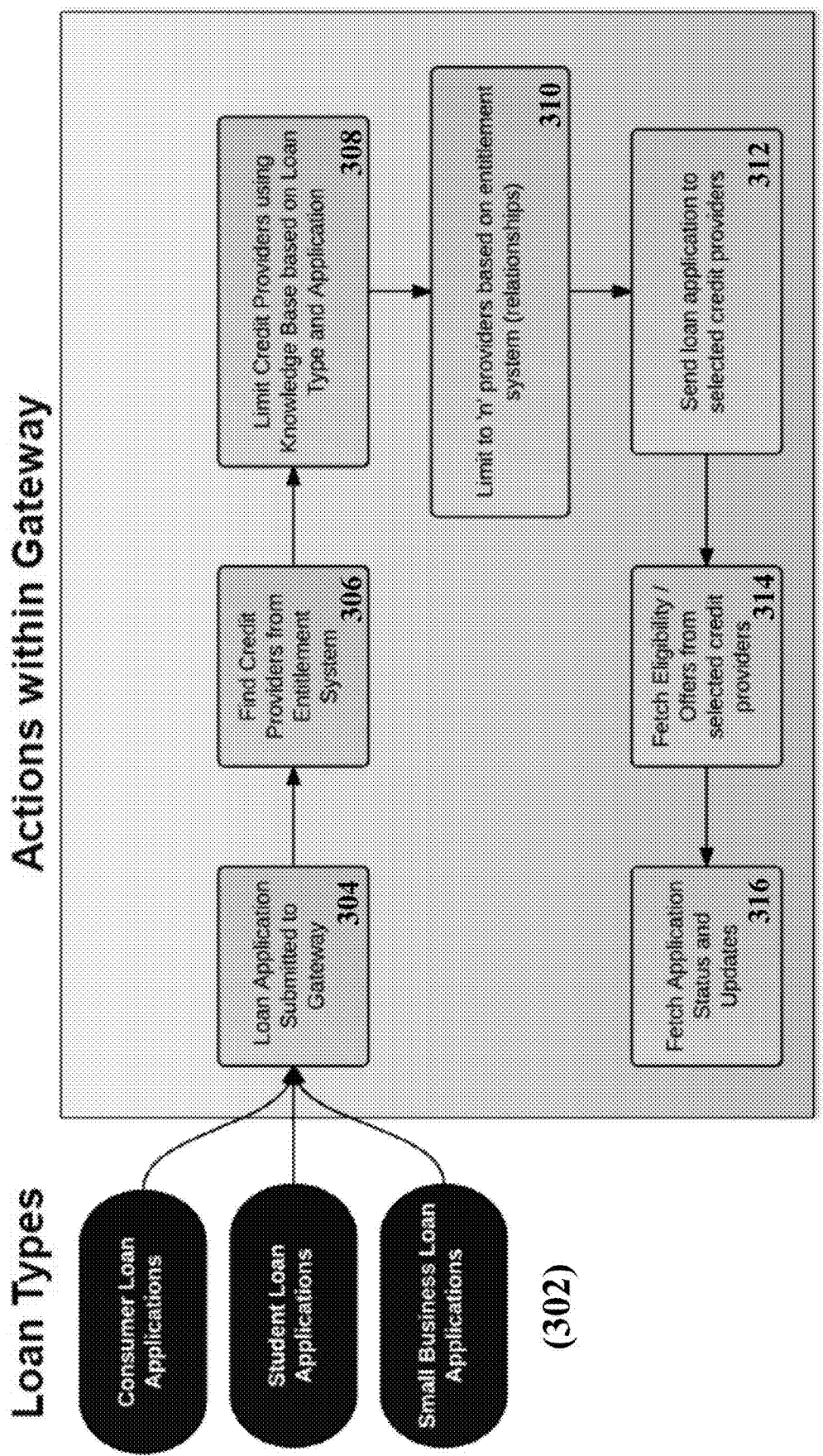
FIG. 3 shows an illustrative example of a process for matching loan inquiries and credit providers based on loan inquiry information in accordance with some embodiments of the disclosed subject matter.

Referring to FIGS. 2 and 3, upon submitting loan inquiries 202 into the marketplace lending network platform, each of the loan inquiries 202 can be transmitted to an entitlement engine 206 and a data analytics engine 208. As described above, entitlement engine 206 can maintain relationships between originators that are submitting referred loan inquiries to the marketplace lending network platform and intermediaries. For example, entitlement engine 206 can manage the provided network of partner institutions including banks, non-banks, institutional investors, and marketplace lending platforms. In another example, entitlement engine can use various criteria to determine which referred loan inquiries are to be routed to particular credit providers or intermediaries in the network. As shown in FIG. 2, entitlement engine 206 can determine recommended partner institutions from the marketplace lending network platform and transmit information identifying the recommended partner institutions to a matching engine 210.

For example, as shown at 306 in FIG. 3, process 300 can include determining one or more suitable credit providers from an entitlement system, such as entitlement engine 206. In another example, as shown at 310 in FIG. 3, process 300 can include limiting the number of credit providers to N number of credit providers based on relationship information and other information provided by the entitlement system, such as entitlement engine 206.

Figure 4:
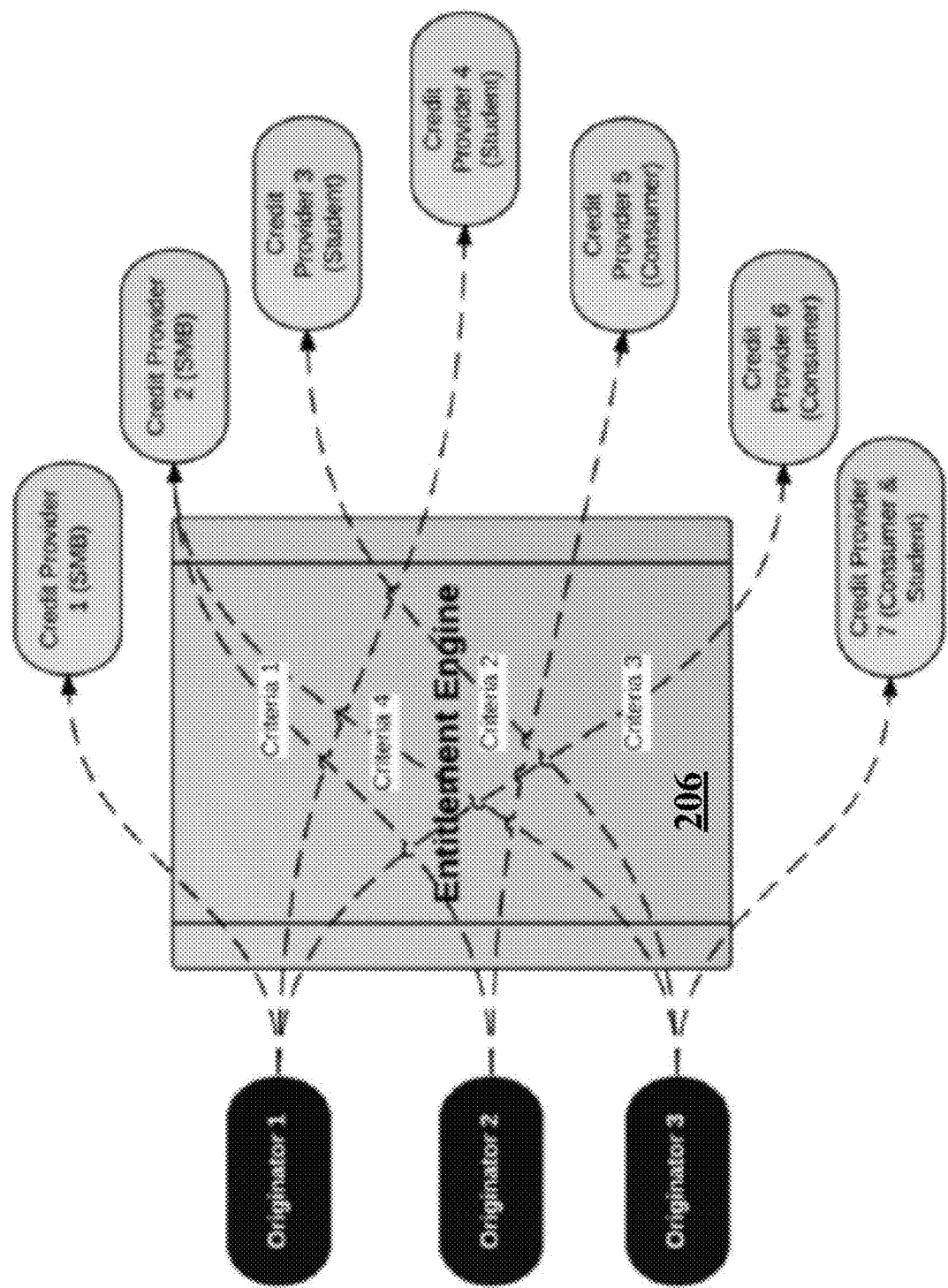
FIG. 4 shows an illustrative entitlement engine that is implemented between various originator and credit provider partner devices in accordance with some embodiments of the disclosed subject matter.

In a more particular example, FIG. 4 shows an illustrative entitlement engine that is implemented between various originator and credit provider partner devices in accordance with some embodiments of the disclosed subject matter.

As shown in FIG. 4, entitlement engine 206 provides real-time, fine-grained authorization between various partners within the marketplace lending network platform. For example, entitlement engine 206 can connect "Originator 1" with "Credit Provider 1 (SMB)," "Credit Provider 4 (Student)," and "Credit Provider 6 (Consumer)." These connections, where a loan inquiry from Originator 1 is transmitted to these credit providers over the real-time message bus, can be made based on specific criteria, such as these credit providers provide the best rates for loan of this particular loan type or these credit providers tend to provide loans to borrowers such as the borrower in the submitted loan inquiry.

In some embodiments, entitlement engine 206 can provide granular, flexible, and externalized access control. Moreover, entitlement engine 206 can manage access policies for all of the relationships between originators and credit providers (or intermediaries) in the network. Additionally or alternatively, each policy can set additional criteria based on application data to further restrict and/or customize the relationship between two parties (e.g., a particular originator and a particular credit provider, a particular originator type and a particular credit provider type, etc.).

In some embodiments, an application programming interface can be provided when one or more credit providers lack an application programming interface for displaying offers. Such an application programming interface can, for example, automate processes and allow the marketplace lending network platform to normalize data flow and discrete functions.

Figure 5:
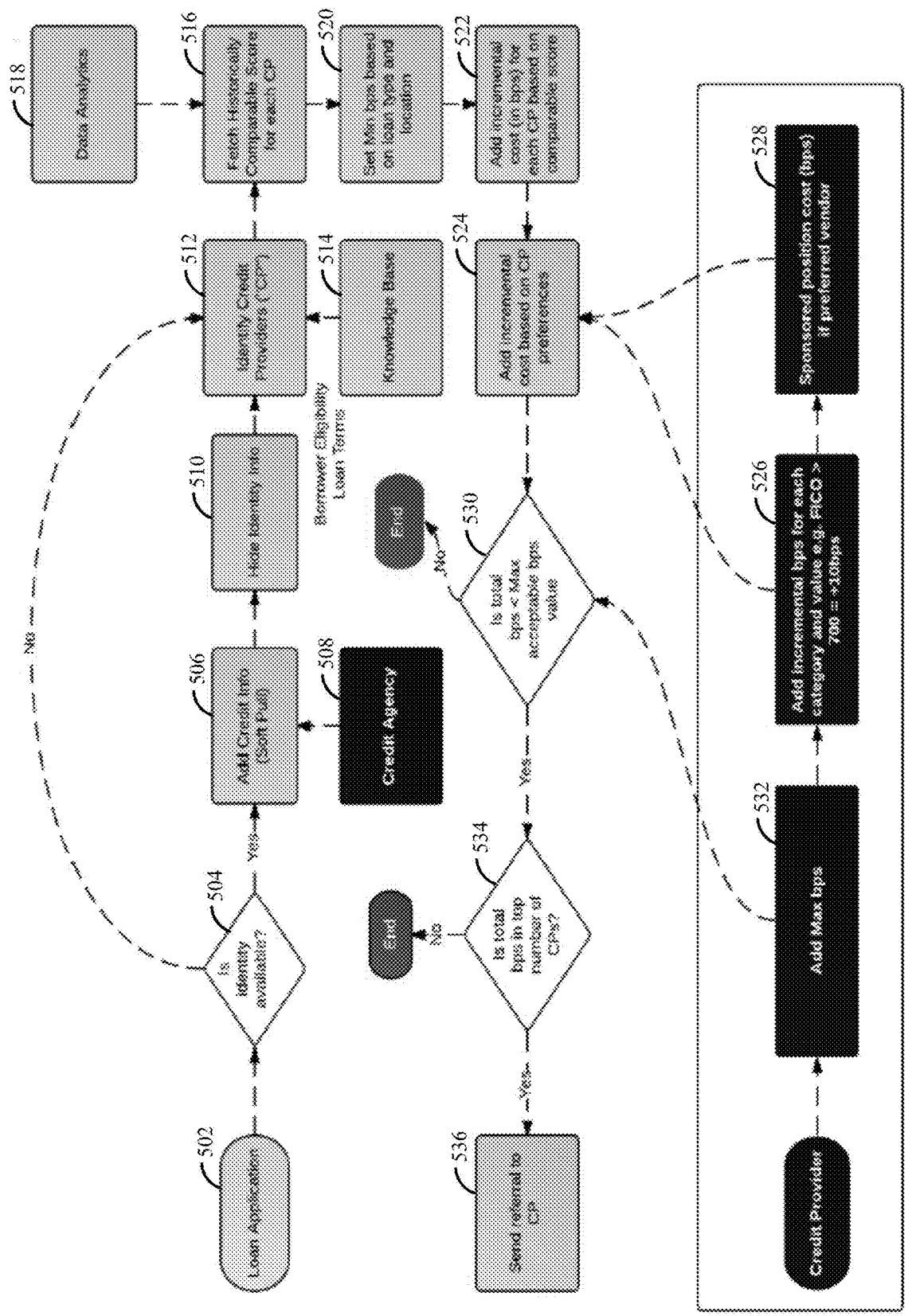
FIG. 5 shows an illustrative example of a process for implementing a borrower referral application programming interface in accordance with some embodiments of the disclosed subject matter.

FIG. 5 shows an illustrative example of a process for implementing a borrower referral application programming interface in accordance with some embodiments of the disclosed subject matter. As shown, in response to a borrower submitting a loan inquiry, the marketplace lending network platform identifies matching credit providers or lenders. As also shown, the marketplace lending network platform transmits loan inquiry information over a real-time message bus to each credit provider (e.g., Credit Provider 1, Credit Provider 2, and Credit Provider 3). Although Credit Provider 1 uses an application programming interface to display the submitted loan inquiry information from the marketplace lending network platform (e.g., Lender 1 API), Credit Provider 2 and Credit Provider 3 use the borrower referral application programming interface to receive and display the submitted loan inquiry information from the marketplace lending network platform. Each credit provider can then determine whether to submit an offer to the borrower that is responsive to the submitted loan inquiry.

In some embodiments, the marketplace lending network platform can determine whether a borrower referral application programming interface is associated with a credit provider device and, in response to determining that the credit provider device is not associated with such a borrower referral application programming interface, the marketplace lending network platform can provide a borrower referral application programming interface for transmitting loan inquiry information to the particular credit provider device. In response to using the borrower referral application programming interface on a particular credit provider device, the credit provider device can receive and display the submitted loan inquiry information from the marketplace lending network platform.

Additionally or alternatively, the marketplace lending network platform can determine whether a credit provider device (e.g., that has been identified as a matching lender by the marketplace lending network platform) has received the loan inquiry information submitted by a borrower. In response to determining that the particular credit provider device has not received the loan inquiry information, the marketplace lending network platform can provide a borrower referral application programming interface for transmitting loan inquiry information to the particular credit provider device. For example, the marketplace lending network platform can transmit a request that includes instructions for accessing the borrower referral application programming interface. In response to using the borrower referral application programming interface on a particular credit provider device, the credit provider device can receive and display the submitted loan inquiry information from the marketplace lending network platform.

Referring back to FIG. 2, in some embodiments, loan inquiries 202 and any other appropriate supplemental loan inquiry information can also be transmitted to data analytics engine 208. For example, data analytics engine 208 can include a data collection used to identify a subset of credit providers for receiving the referred loan inquiry. In a more particular example, data analytics engine 208 can be used to identify matching credit providers according to relationships and/or borrower experience.

In a more particular example, as shown at 310 in FIG. 3, data analytics engine 208 can work in connection with entitlement engine 206 or any other suitable relationship management system to identify matching credit providers from multiple credit providers based on relationship information, borrower experience information, and/or any other appropriate criteria.

In some embodiments, as shown in FIG. 2, matching engine 210 can receive additional or supplemental information from knowledge base 212 that has an information repository of credit providers and borrowers eligibility criteria. For example, in response to registering with the marketplace lending network platform, the credit providers or borrowers can receive a request to provide credit information, such as credit history information, authorization to obtain credit-related information, prior lending experiences, prior loan terms, etc. In another example, borrowers can receive a request to provide affirmative authorization to obtain such credit information, where the resulting credit information is associated with a profile of the borrower that is stored in knowledge base 212.

In a more particular example, as shown at 308 in FIG. 3, matching engine 210 can limit credit providers using knowledge base 212 based on loan type and loan inquiry information. For example, matching engine 210 can filter particular credit providers for transmitting referred loan inquiries based on the loan type associated with the loan inquiry (e.g., only student loan inquiries, no automobile loan inquiries, etc.). In another example, matching engine 210 can filter particular credit providers for transmitting referred loan inquiries based on loan inquiry information (e.g., loan inquiries asking for less than a predefined amount, loan inquiries associated with borrowers having a credit score greater than a threshold credit score, etc.).

As also shown in FIG. 2, matching engine 210 can determine which credit providers are to receive the one or more submitted loan inquiries 202 from borrowers 204.

In response, the marketplace lending network platform can receive responses or any suitable indications as to whether each of the selected credit providers has approved and funded the loan for a submitted loan inquiry. For example, in response to receiving an indication that a submitted loan inquiry from one or more of the borrowers 204 has not been approved and funded, the process of FIG. 2 in connection with that loan inquiry can terminate. Alternatively, in response to receiving an indication that a submitted loan inquiry from one or more of the borrowers 204 has been approved and funded, the process of FIG. 2 can report that the loan has been funded. Other features, such as providing information to support the presentation of loan offers, aggregating loan offers, and the presentation of particular loan offers to borrowers and/or referrer devices are described further herein.

In some embodiments, referring to FIG. 3, the marketplace lending network platform can transmit each loan inquiry to selected credit providers at 312 over a real-time message bus and fetch loan offers from each of the selected credit providers at 314. For example, the marketplace lending network platform can fetch offer information corresponding to each loan inquiry from selected credit providers. In another example, the marketplace lending network platform can filter particular loan offers from the fetched offer information to transmit to a particular borrower or referrer device in response to a loan inquiry.

In some embodiments, in response to transmitting one or more loan offers and corresponding offer information for a loan inquiry to a particular borrower or referrer device, the marketplace lending network platform can continually fetch loan application status and updates. This can include, for example, an indication that a loan offer has been accepted by the borrower referred by the referrer device and the loan process has been initiated in which funds are being transferred to the borrower. This can also include, for example, an indication that the credit provider has decided to withdraw a loan offer to a particular borrower. This can further include, for example, indications as to whether the borrower and/or the credit provider are complying with the terms of the loan (e.g., providing the requested funds, receiving payments from the borrower at particular times, etc.).

Figure 6:
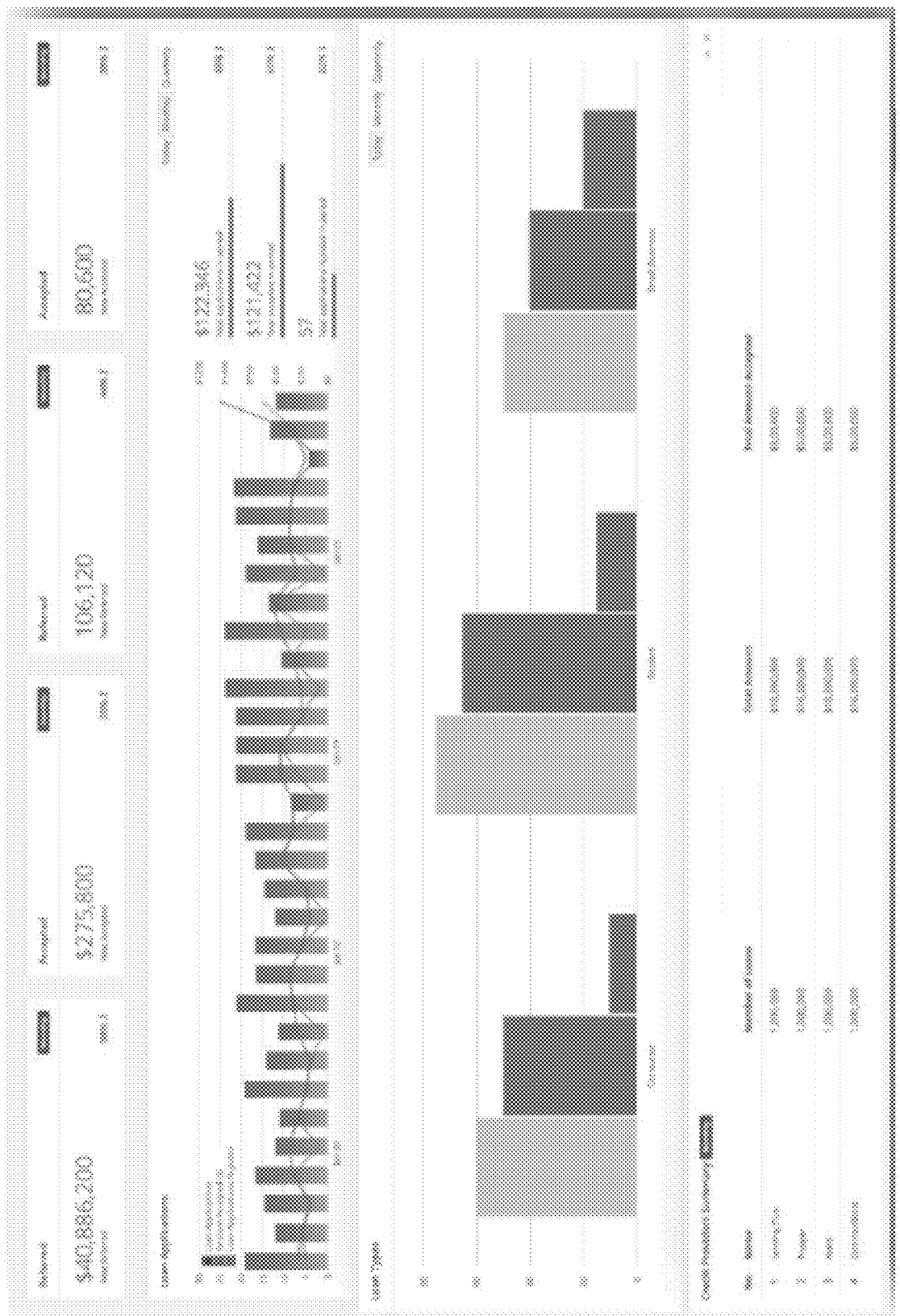
FIG. 6 shows an illustrative user interface that can be presented to a credit provider device showing an overview of the loans made or purchased by the credit provider in accordance with some embodiments of the disclosed subject matter.

In some embodiments, the marketplace lending network platform can provide any suitable number of user interfaces to provide loan-related information to users in the network. For example, as shown in FIG. 6, a user interface can be provided to show an overview of the loans made by a credit provider organized by type, volume, and platform. It should be noted that any other suitable metric can be provided based on such loan-related information. In another example, as shown in FIG. 7, a user interface can be provided that allows a user at the credit provider device to sort and filter through individual loans (e.g., identification number, originator or referrer device information, loan type, status, loan amount, loan term, etc.). Upon selecting one of the individual loans, detailed loan information can be presented in the user interface.

Referring back to FIG. 2, additional investor tools, such as the Lendvious Institutional tool 220 and the Portfolio Compass tool 230, can connect to various users within the marketplace lending network platform. For example, these investor tools can enable investors to view and select loans to fund and to monitor loan performance data after purchasing the loans.

Figure 8A:
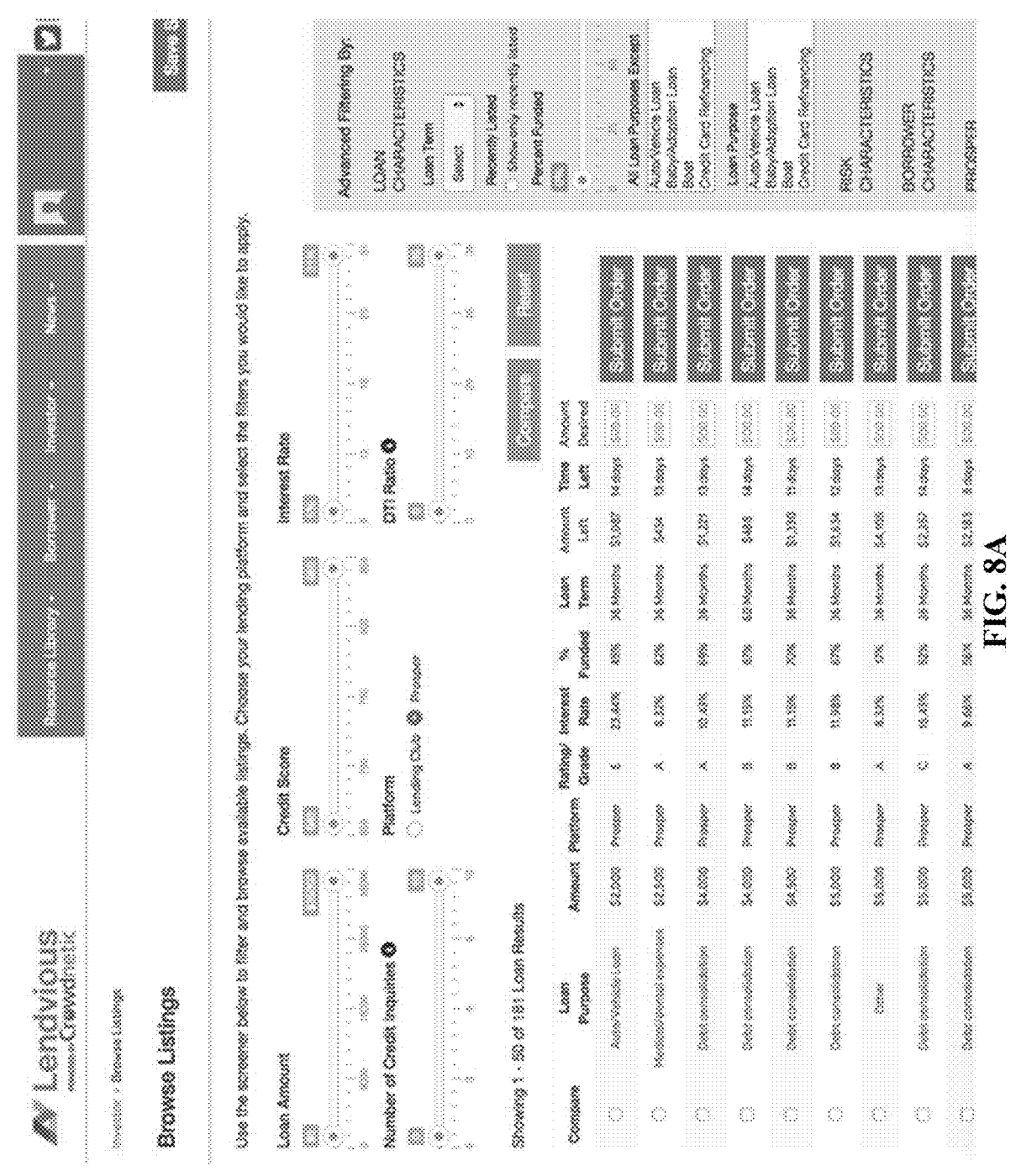

As described herein, the marketplace lending network platform can be used to receive loan inquiries and instantaneously and/or simultaneously submit the loan inquiries to multiple platforms. In some embodiments, an investor tool can connect with the marketplace lending network platform to provide investors with analytical tools in accordance with an investor's risk or return parameters. For example, as shown in FIG. 8A, the investor tool can allow investors to manage multiple marketplace lending portfolios, where each investor can be provided with the opportunity to browse through listings, create portfolios, and analyze historical performance. In another example, the investor tool can automate the loan selection process across multiple lending platforms. In yet another example, the investor tool can provide loss-adjusted cash flow information based on one or more portfolio assumptions to estimate returns on actual and/or hypothetical portfolios.

Figure 8B:
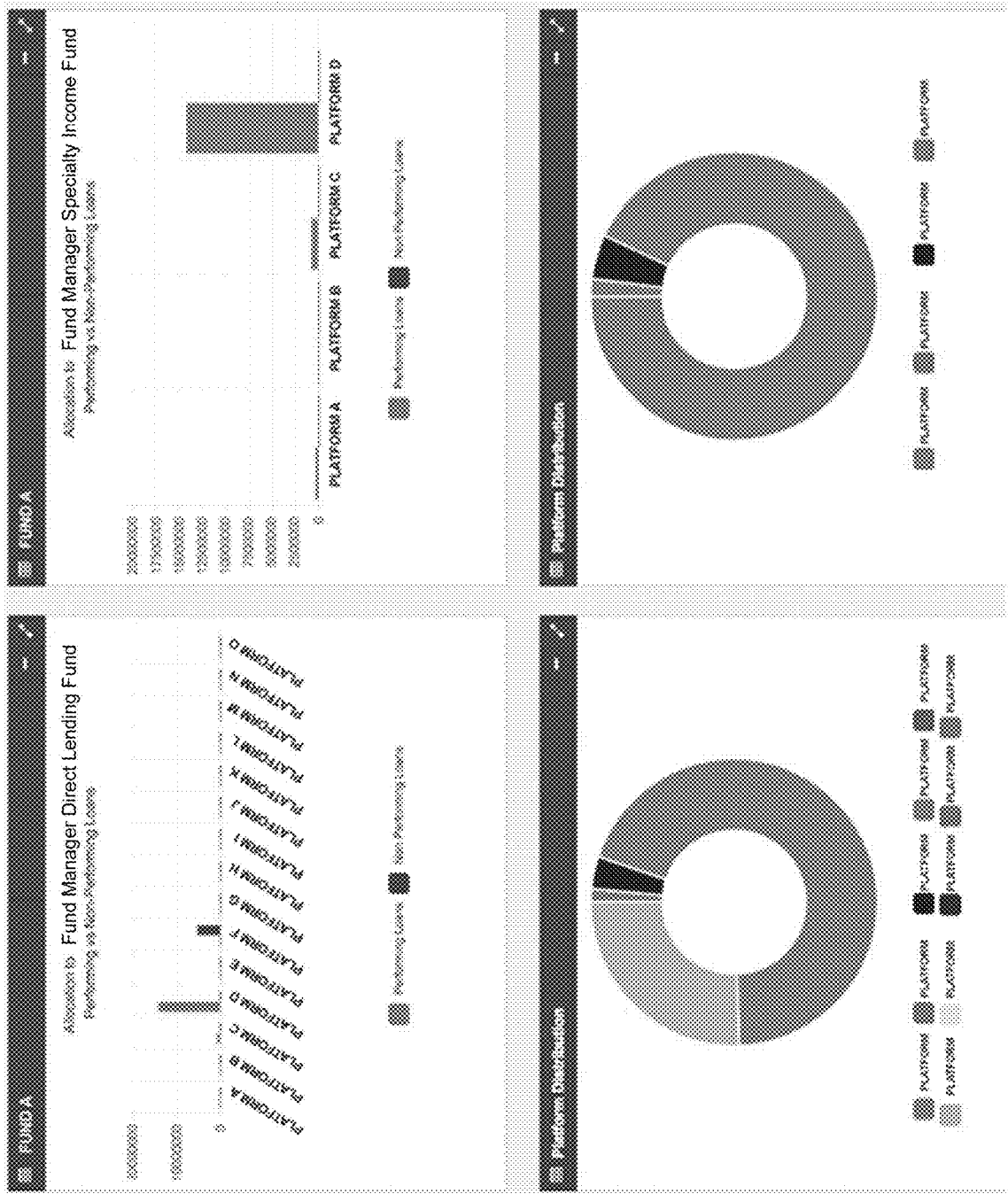
FIG. 8B shows an illustrative reporting user interface provided in accordance with some embodiments of the disclosed subject matter.

In some embodiments, a reporting tool can connect with the marketplace lending network platform to provide interfaces that report investor holdings while identifying risk, thereby providing a view for future allocations. These reporting features can include balance sheet information, performance reports, and compliance information. For example, as shown in FIG. 8B, the reporting application can provide interfaces that show current assets, outstanding principal, and liabilities. In another example, the reporting application can determine whether portfolio covenants are within leverage-provider requirements. Any other suitable information can be provided in the interfaces of the reporting application, such as projected performance information (e.g., user-defined curves, prepayment determinations, etc.), internal rate of return information, multiple of invested capital information, monthly cash flow information, etc.

In a more particular example, the reporting application programming interface can provide lenders using credit provider devices with loan status information in response to connecting borrowers from referrer devices with the lenders. The reporting application programming interface can, for example, allow the marketplace lending network platform to collect, organize, normalize, and present loan status information. This can, for example, allow referral partners to receive loan status information, thereby facilitating the purchase of retail goods and services to their retail client base.

Figure 9:
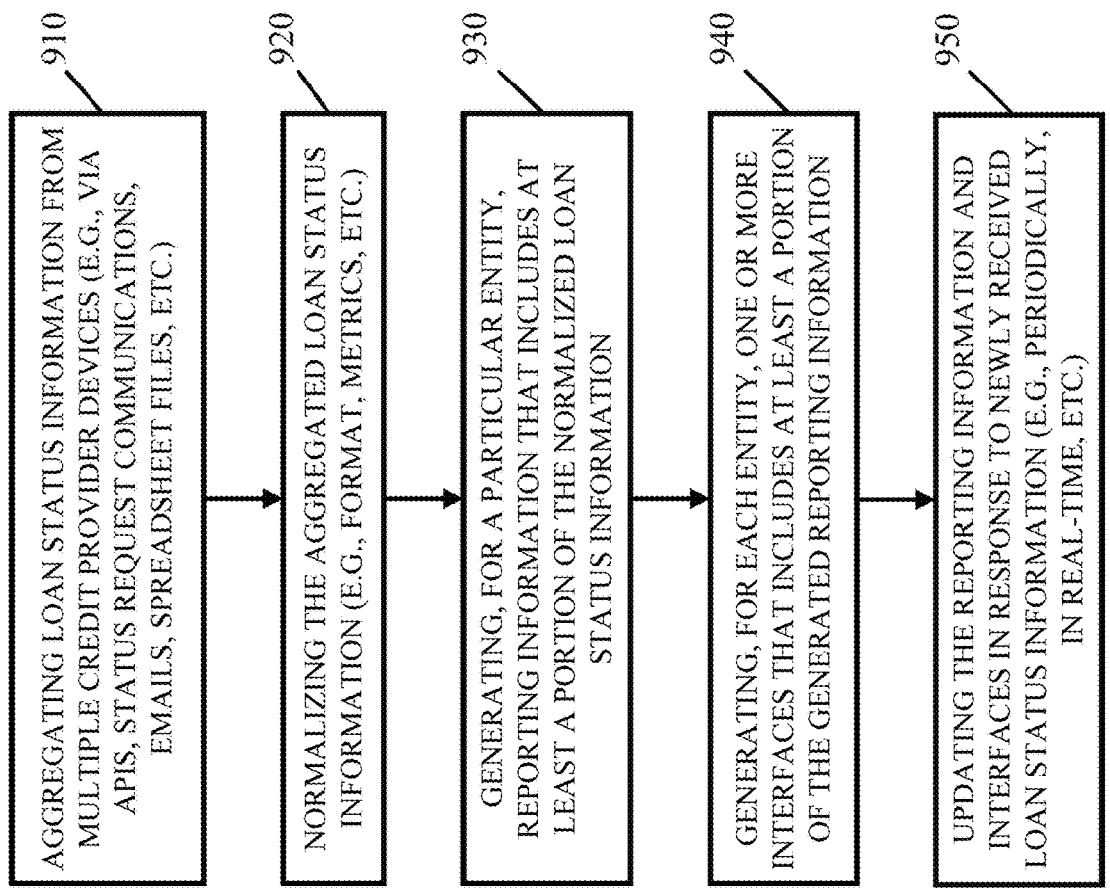
FIG. 9 shows an illustrative example of a process for implementing a reporting application programming interface in accordance with some embodiments of the disclosed subject matter.

FIG. 9 shows an illustrative example of a process for implementing a reporting application programming interface. As shown, the reporting application programming interface can be configured to provide loan status information from multiple credit provider devices (e.g., Credit Provider 1, Credit Provider 2, and Credit Provider 3) for multiple borrowers through multiple referrer devices in connection to various loan types. Although Credit Provider 1 uses an application programming interface for reporting information to the marketplace lending network platform (e.g., Lender 1 API), Credit Provider 2 and Credit Provider 3 can use the reporting application programming interface to transmit loan inquiry status information and other reporting information to the marketplace lending network platform. In some embodiments, the marketplace lending network platform can determine whether a reporting application programming interface is associated with a credit provider device and, in response to determining that the credit provider device is not associated with such a reporting application programming interface, the marketplace lending network platform can provide a reporting application programming interface for transmitting loan inquiry status information from the particular credit provider device.

The marketplace lending network platform can then aggregate, track, analyze, and/or normalize loan inquiry status information from the multiple credit providers. For example, normalizing the loan inquiry status information can include placing the loan inquiry status information into a suitable format for reporting to a given entity, such as a particular referral partner. In another example, the aggregated, tracked, analyzed, and/or normalized loan inquiry status information can be used to generate outputs and reports, similar to those shown in FIG. 8B, for particular entities and/or generate one or more user interfaces that provide access to the reports and loan inquiry status information.

As also shown in FIG. 9, in some embodiments, the marketplace lending network platform can transmit periodic updates on customized reporting across multiple interfaces. For example, Referral Partner 1 can receive periodic updates on corresponding loan inquiry status information via a web interface, Referral Partner 2 can receive periodic updates on corresponding loan inquiry status information via an application programming interface, Referral Partner 3 can receive periodic updates on corresponding loan inquiry status information by file delivery via a file transfer protocol (FTP), and Referral Partner 4 can receive periodic updates on corresponding loan inquiry status information by email. In a more particular example, the marketplace lending network platform can provide a reporting application programming interface to one or more referral partners to receive the periodic updates and/or reports.

Figure 10:
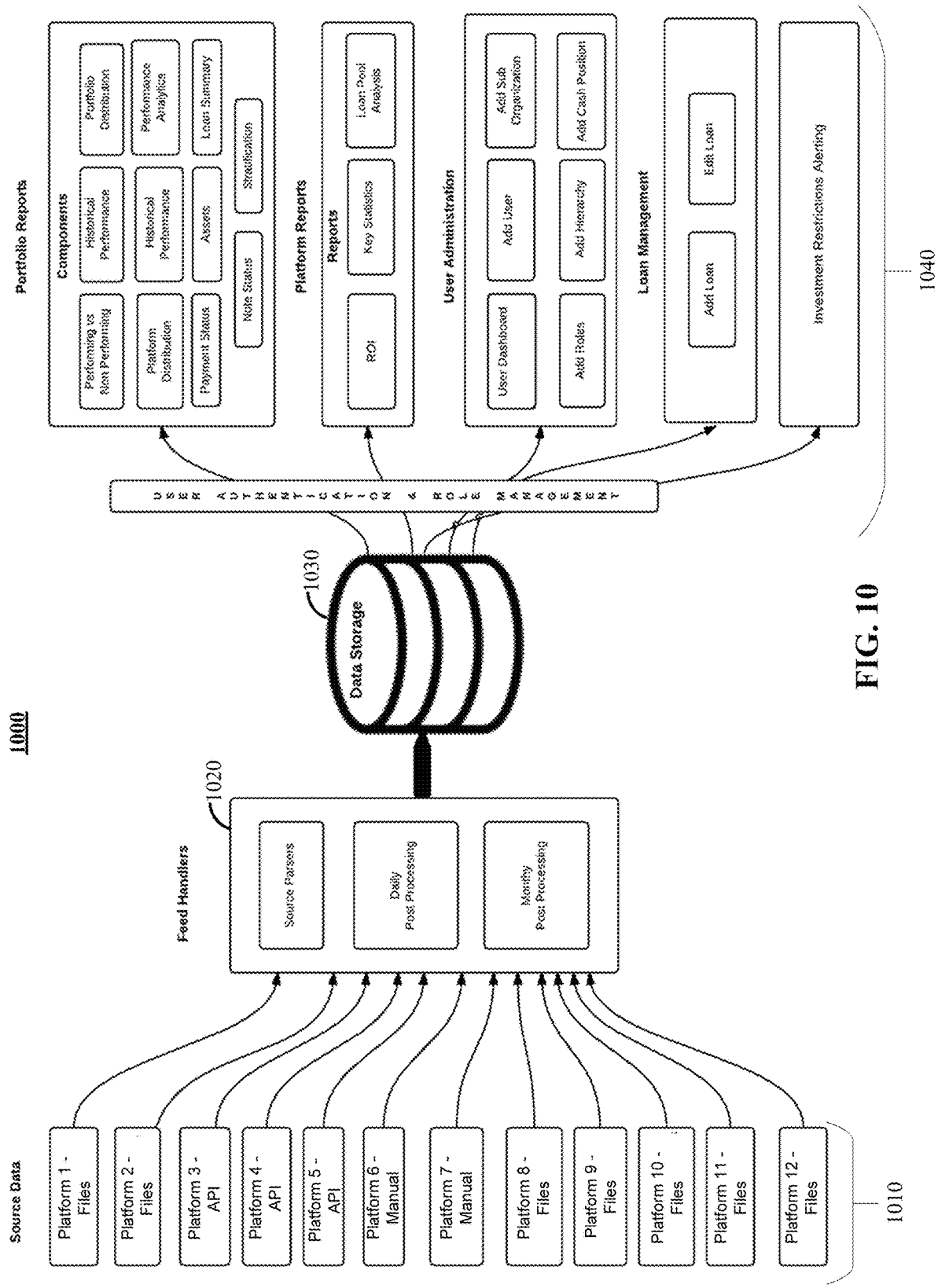
FIG. 10 shows an illustrative example of the marketplace lending network architecture, which includes reporting tools based on source loan information, in accordance with some embodiments of the disclosed subject matter.

FIG. 10 shows an illustrative architecture for providing a reporting application programming interface in accordance with some embodiments of the disclosed subject matter. For example, this architecture 1000 can be used to track aggregated portfolio and loan-level data and generate analytics that enable entities, such as referral partners, to monitor portfolios information across multiple lending platforms and/or across multiple asset classes. In a more particular example, this architecture 100 can be used to generate loan performance information and, upon retrieving one or more models, determine historical and projected loan performance metrics.

Turning to FIG. 10, architecture 1000 can include collecting and aggregating platform source loan data from multiple sources and multiple formats in devices 1010. For example, as shown in FIG. 10, each device 1010 can transmit platform source loan data files via an application programming interface (e.g., in XML, JSON, etc.), file transfer protocols (e.g., SFTP, FTP, etc.), email communications, and/or other suitable document types. In a more particular example, each device 1010 can create a secure connection channel between the device 1010 and one or more feed handler devices 1020. These feed handler devices 1020 can receive and/or transmit queries to devices 1010 for platform source loan data. As described above in connection with FIG. 9, feed handler devices 1020 can aggregate (or disaggregate), map, and/or normalize the platform source loan data from multiple devices 1010. As shown in FIG. 10, these feed handler devices can perform various daily or monthly post-processing features. It should be noted that such post-processing performed on platform source loan data can be performed at any suitable time (e.g., instantaneously, every ten seconds, every twelve hours, etc.).

In some embodiments, the aggregated, mapped, and/or normalized loan data can be stored in a data storage device 1030 for use by a reporting system 1040 that includes a user authentication and role management component 1050.

In some embodiments, as shown in FIG. 11, upon implementing architecture 1000, reporting system 1040 can use the aggregated, mapped, and/or normalized loan data stored in a data storage device 1030 to generate key reporting metrics in accordance with some embodiments of the disclosed subject matter. More particularly, FIG. 11 shows customized output generated by reporting system 1040, where automated data collection from devices 1010 can provide real-time updates to portfolio data available to investors, where loan information can be presented by loan characteristics (e.g., secured vs. unsecured, performing vs. non-performing, etc.), and where gross and net returns can be tracked by loan platform and layer in loss rate and fee assumptions.

In some embodiments, upon implementing architecture 1000, reporting system 1040 can use the aggregated, mapped, and/or normalized loan data stored in a data storage device 1030 to generate portfolio reports that present analytics and visualizations at a portfolio level in accordance with some embodiments of the disclosed subject matter. It should be noted that these portfolio reports can be stored (e.g., in data storage device 1030) such that users are provided with the ability to review historical portfolio positions.

Figure 12:
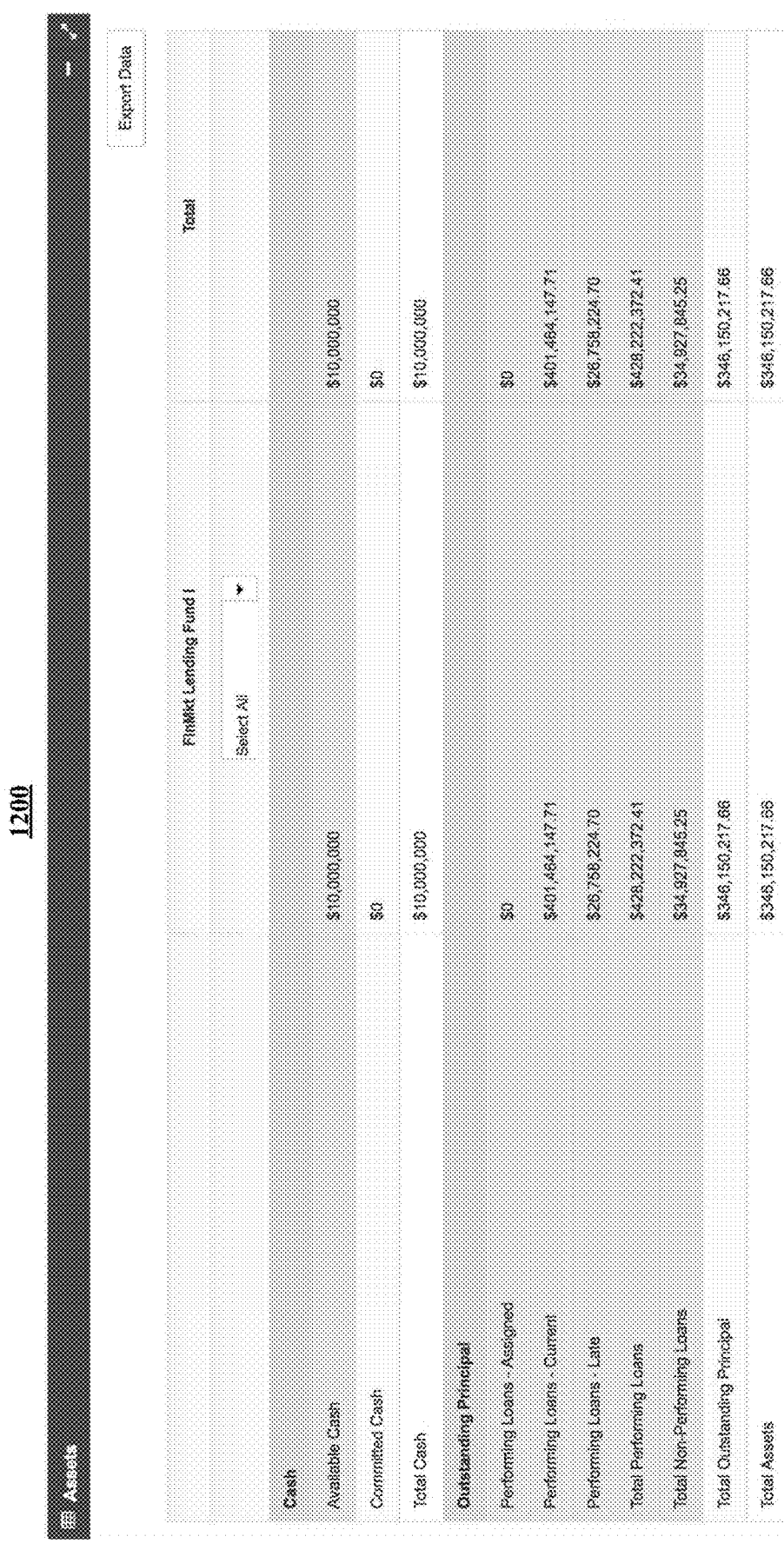

For example, in some embodiments, FIG. 12 shows an illustrative overview or high-level snapshot of a portfolio associated with a lender user in accordance with some embodiments of the disclosed subject matter. As shown in FIG. 12, a lender user can select one or more lending platforms using an interface element (e.g., a drop-down menu) to view loan data at a platform level. It should be noted that the loan data can be updated at any suitable frequency (e.g., daily, weekly, the same frequency at which the data is received by a feed handler, etc.). It should also be noted that, in response to presenting interface 1200 with platform-specific loan data, interface 1200 can provide another interface element that, upon selection, exports the platform-specific loan data.

In another example, in some embodiments, FIG. 13 shows an illustrative investment restrictions interface that can be presented to a lender user in accordance with some embodiments of the disclosed subject matter. As shown in FIG. 13, a lender user can use investment restrictions interface 1300 to monitor key metrics, manage, and report risk at a particular frequency (e.g., daily). For example, in response to determining that particular metrics have fallen out of bounds (e.g., greater than an upper threshold value, less than a lower threshold value, etc.), reporting system 1040 can generate investment restrictions interface 1300, where the out-of-bounds metrics are highlighted (e.g., in a particular color, in a particular font, with a particular highlight region, etc.). In a more particular example, as shown in FIG. 13, in response to determining that trade receivable term, debt instrument allocation for each loan, and debt instrument allocation for each sub-category are beyond particular threshold values (e.g., an 180 day maximum, a maximum of 2% of GA, and a maximum of 20% of sub-category allocation, respectively), investment restrictions interface 1300 can present highlight regions around the associated investment restriction values.

Figure 14:
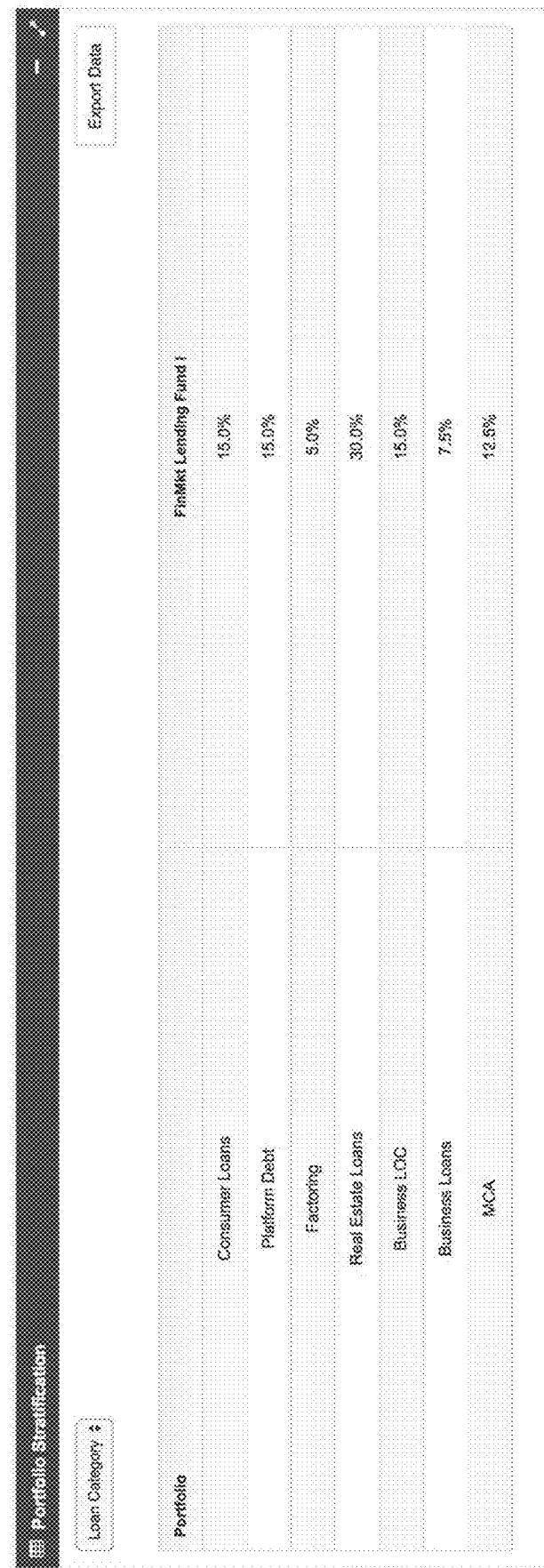

In some embodiments, FIG. 14 shows an illustrative portfolio stratification interface that can be presented to a lender user in accordance with some embodiments of the disclosed subject matter. As shown in FIG. 14, portfolio stratification interface 1400 can stratify the portfolio of a lender user to present portions of loan information based on varying loan criterion, such as loan category, lending platform, security type, payment status, and other loan characteristics. In a more particular example, as shown in FIG. 14, in response to selecting loan category as the loan characteristic, portfolio stratification interface 1400 can include loan information associated with each loan category in the portfolio of the lender user, such as consumer loans, platform debt, real estate loans, business loans, etc. It should be noted that portfolio stratification interface 1400 is merely illustrative and any suitable field in the received loan data can be used to generate portfolio stratification interface 1400.

Figure 15:
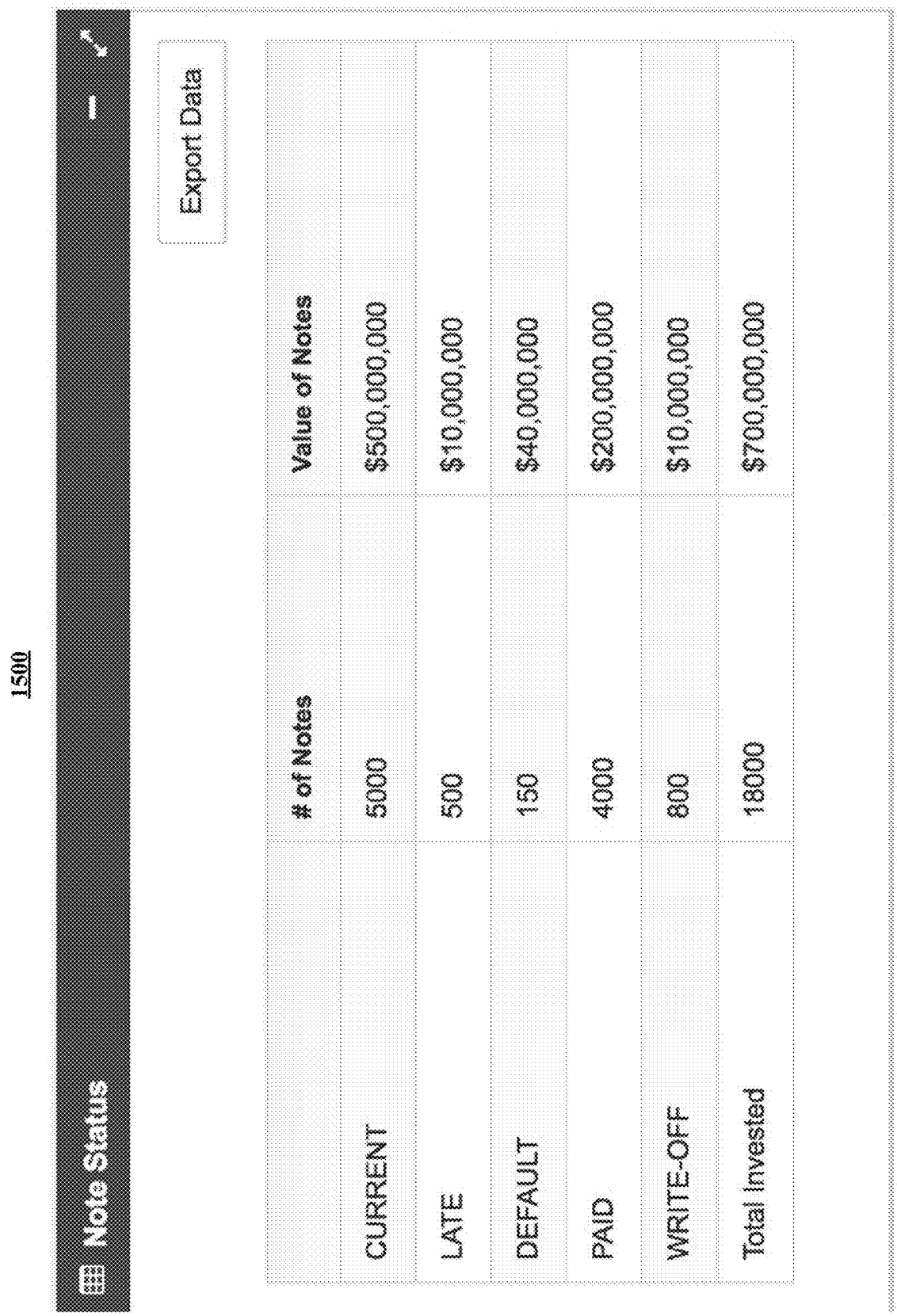

In some embodiments, FIG. 15 shows a payment status interface that can be presented to a lender user in accordance with some embodiments of the disclosed subject matter. It should be noted that each asset that is added to a portfolio can be assigned a payment status based on current performance information. As shown in FIG. 15, payment status interface 1500 can provide an indication of the value and count of each security and associates payment status across the portfolio or platform. In a more particular example, as shown in FIG. 15, payment status interface 1500 presents overall payment status information, such as the number and value of loan assets that are current, late, in default, paid, and written-off as well as the total number and value of investment.

Figure 16:

Additionally or alternatively, in some embodiments, FIG. 16 shows a payment status interface that can be presented to a lender user in accordance with some embodiments of the disclosed subject matter. As shown in FIG. 16, payment status interface 1600 can provide an indication of the currently received payments. This can include, for example, transaction details regarding the type of payment, such as principal payments and interest payments. This can also include, non-principal and non-interest payments, such as late fees or other payments specified by the lending user.

In some embodiments, FIG. 17 shows a portfolio distribution interface that can be presented to a lender user in accordance with some embodiments of the disclosed subject matter. As shown in FIG. 17, portfolio distribution interface 1700 can present multiple category outputs across individual platforms. Such category outputs for each platform can include amount invested, percentage of the total portfolio, secured percentage, gross return rate, loss rate, fees percentage, and net return rate. It should be noted that portfolio distribution interface 1700 can be configured to provide different views of the loan information across individual platforms, such as current or active investments, original investments which include current and completed investments, and completed investments which include paid and written-off investments.

Additionally or alternatively, in some embodiments, FIG. 18 shows a portfolio distribution interface that can be presented to a lender user in accordance with some embodiments of the disclosed subject matter. It should be noted that each security that is added to a platform can be assigned a category, a sub-category, and a loan type. Examples of a category can include a mortgage, a small business loan, an invoice, a consumer loan, etc. Examples of a sub-category can include a short term loan, a long term loan, a short term secured loan, a long term secured loan, etc. Loan type can be used to define the payment structure of the particular security and examples of loan type can include deferred payments, deferred interest payments, balloon payments, etc. As shown in FIG. 18, portfolio distribution interface 1800 can present the dollar amount (or other suitable currency or cryptocurrency) invested in each of the sub-categories by platform.

Figure 19:
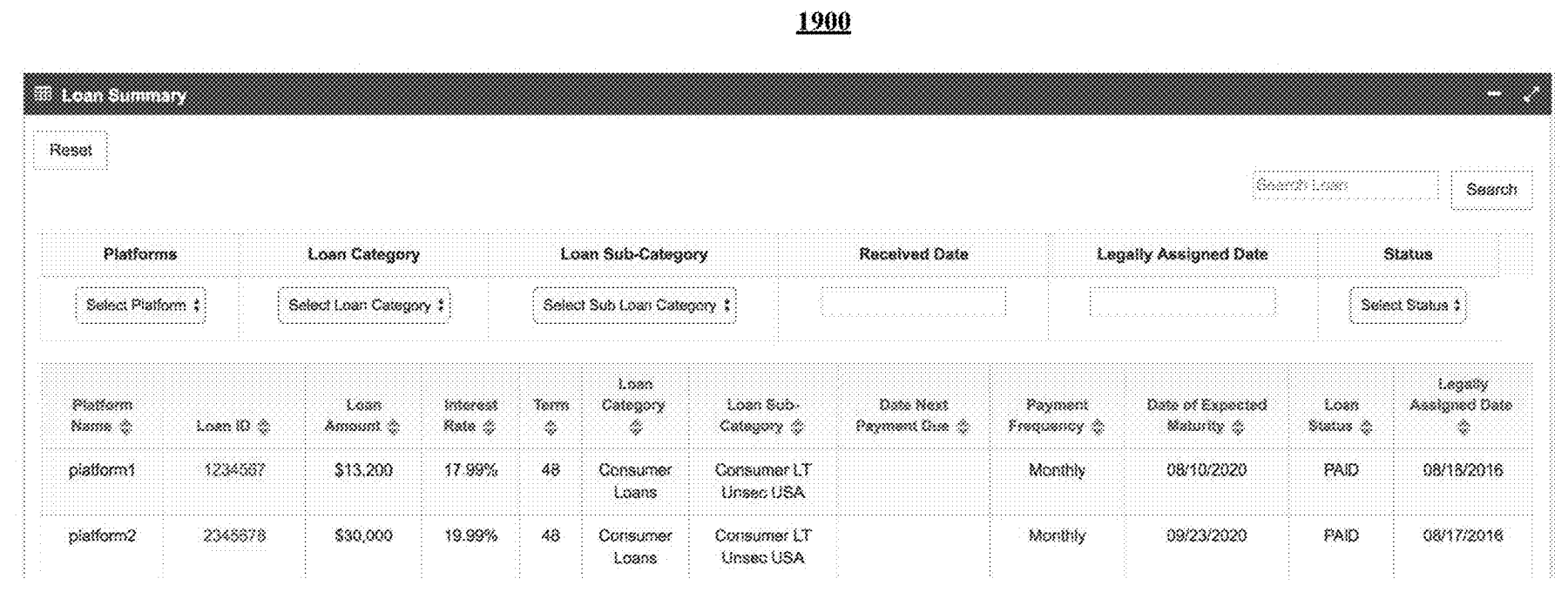

In some embodiments, FIG. 19 shows a loan summary interface that can be presented to a lender user in accordance with some embodiments of the disclosed subject matter. As shown in FIG. 19, loan summary interface 1900 can present a continuous stream of loan information and provide a lending user with an opportunity to search for particular loan information. In some embodiments, loan summary interface 1900 can provide a lending user with an opportunity to filter loan information by platform, loan category, loan sub-category, loan status, loan identifier, and/or any other suitable parameter.

In some embodiments, FIG. 20 shows a loan information export interface that can be presented to a lender user in accordance with some embodiments of the disclosed subject matter. The aggregated, mapped, and/or normalized data that is placed into data storage 1030 by one or more feed handlers 1020 can be exported to a device associated with the lender user using loan information export interface 2000. For example, as shown in FIG. 20, loan information export interface 2000 can provide multiple parameters, such as platform, loan category, loan sub-category, loan date, and/or any other suitable parameter, for retrieving and exporting particular loan information. As also shown in FIG. 20, loan information export interface can provide the lender user with an opportunity to include detailed loan information and/or loan payment information along with the exported loan information.

In some embodiments, upon implementing architecture 1000, reporting system 1040 can generate platform reports that present analytics and visualizations at a platform level in accordance with some embodiments of the disclosed subject matter.

Figure 21:
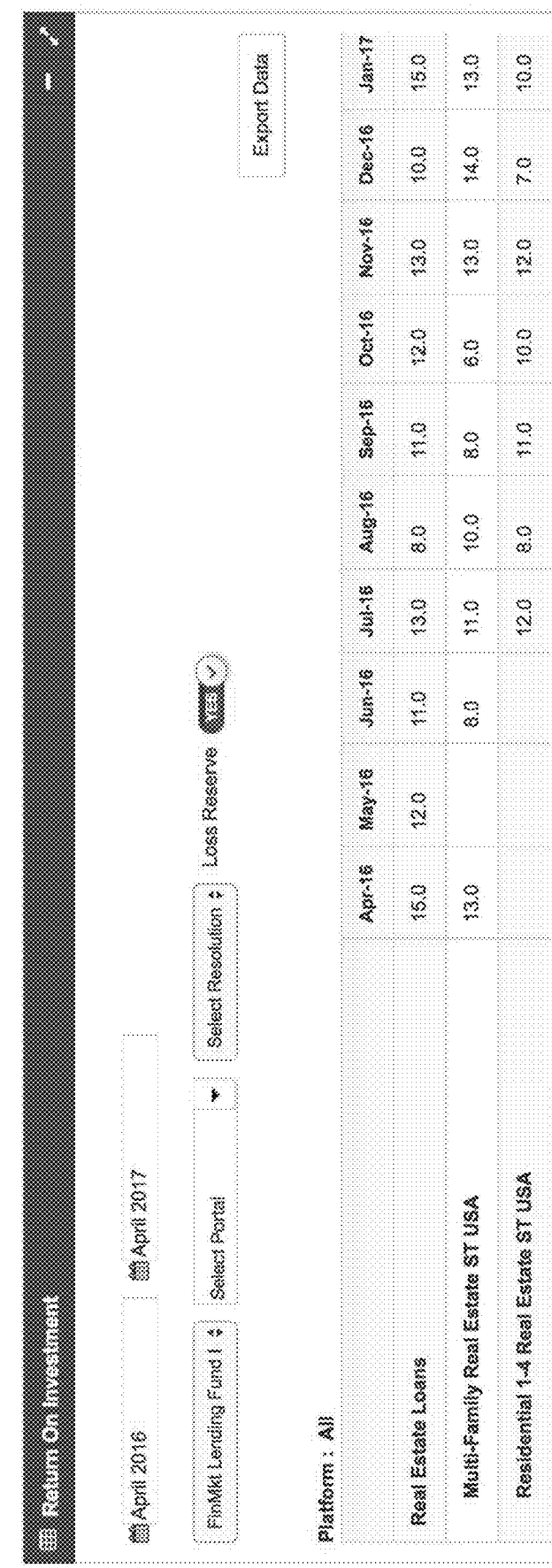

For example, in some embodiments, FIG. 21 shows a return on investment interface that can be presented to a lender user in accordance with some embodiments of the disclosed subject matter. It should be noted that a projected rate of return, an actual rate of return, and/or an adjusted rate of return can be calculated for each asset or loan that is added to a portfolio. For example, a projected rate of return for an asset can be calculated based on the data that was available when the loan was first assigned to the portfolio. In another example, an actual rate of return can be calculated based on a current snapshot of the loan data. In yet another example, an adjusted rate of return can be calculated where loss reserve has been taken into account. In response, reporting system 1040 can calculate a weighted average of the rates of return across all of the assets. As shown in FIG. 21, these weighted averages determined by reporting system 1040 can be viewed on return on investment interface 2100 at a portfolio level, a platform level, or a loan category level.

It should be noted that, as shown in FIG. 21, any suitable calculation period can be specified (e.g., April 2016 through April 2017) and the associated loan data can be viewed at any suitable time interval (e.g., monthly, quarterly, yearly, etc.).

In another example, in some embodiments, FIG. 22 shows a key statistics interface that can be presented to a lender user in accordance with some embodiments of the disclosed subject matter. Continuing from the example shown in FIG. 21, key statistics interface 2200 can present key statistics in the form of weighted averages along particular time intervals at a portfolio, platform, category, and/or sub-category level.

In some embodiments, upon implementing architecture 1000, reporting system 1040 can provide loan management tools that assist users with tracking, monitoring, and/or managing data at the loan level in accordance with some embodiments of the disclosed subject matter.

Figure 23:
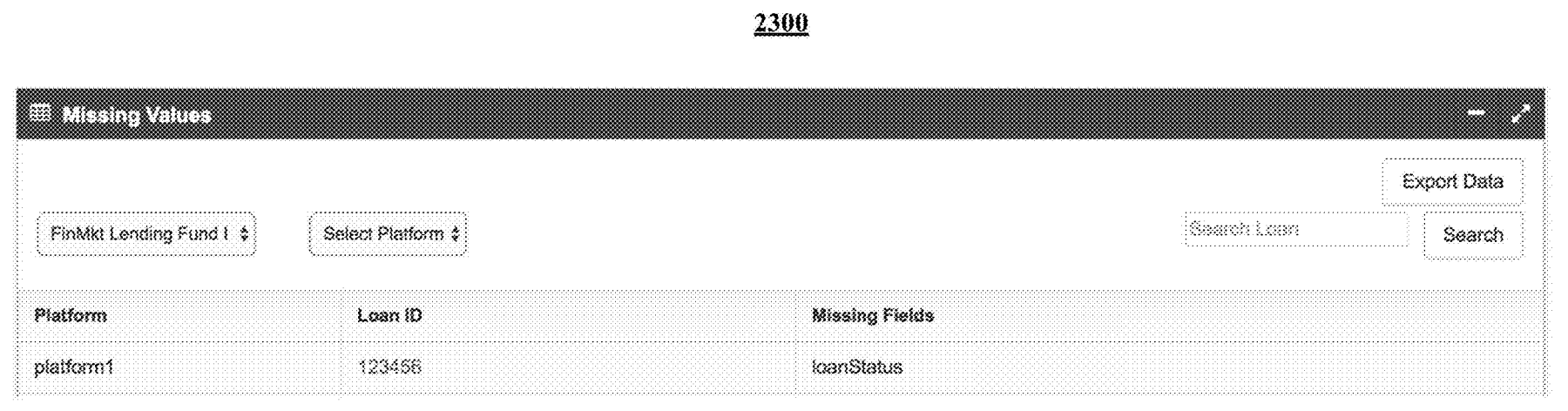

For example, in some embodiments, FIG. 23 shows a missing values interface that can be presented to a lender user in accordance with some embodiments of the disclosed subject matter. As described above in connection with FIG. 10, data from various data sources and data devices can have different data points and can be structured in different manners. The feed handlers 1020 or any other suitable component of architecture 1000 can provide a default data structure and, in response to determining that data received from one of the data devices 1010 is missing from a field in the default data structure, feed handler 1020 can determine a value for insertion into the missing field. This determined value can be based on the platform, category, sub-category, and/or loan type.

In some embodiments, for a field in which there is a missing value and no default data structure in place in which the missing value is determined, a missing values interface 2300 can be presented that includes such missing fields.

In some embodiments, for a field in which there is a missing value and a default data structure in place in which the missing value is determined, missing values interface 2300 can be presented with the field and the determined value. The lending user can, for example, be provided with an opportunity to review, approve, and/or modify the determined value assigned to the field.

In some embodiments, upon implementing architecture 1000, reporting system 1040 and/or user authentication and role management component 1050 can provide administrative management tools that create default settings, create user profiles, configure access permissions, and/or manage other administrative features in accordance with some embodiments of the disclosed subject matter. For example, reporting system 1040 and/or user authentication and role management component 1050 can provide a lending user with an opportunity to manage various accounts, create roles for particular users, and track changes made on the platform. In another example, reporting system 1040 and/or user authentication and role management component 1050 can provide a lending user with an opportunity to create roles that control access to various tools and/or features available on the platform, where these roles can be assigned to one or more users on the platform. In yet another example, reporting system 1040 and/or user authentication and role management component 1050 can provide an audit log that tracks changes made to the platform.

Figure 24:
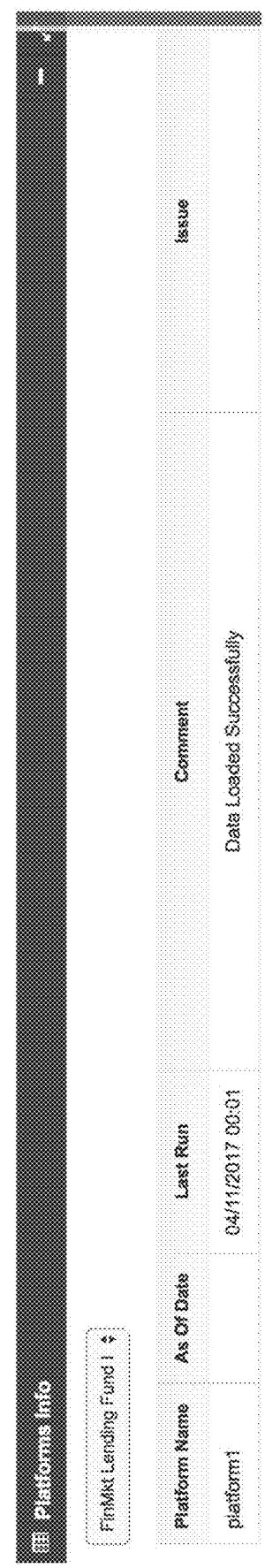

For example, in some embodiments, FIG. 24 shows an illustrative platform information interface that can be presented to a lender user (or an administrative user associated with the lending entity) in accordance with some embodiments of the disclosed subject matter. As shown in FIG. 24, platform information interface 2400 can summarize and present errors in the files or data from the different data sources. This can, for example, assist an administrative user associated with a lending entity, to identify and address issues with source data providers (e.g., data format, data transmission, missing values, etc.). In response, the administrative user associated with a lending entity can, for example, designate one or more data sources that should not be approved for receiving loan information. Additionally or alternatively, the administrative user associated with the lending entity can, for example, designate one or more data sources that should be suspended from receiving loan information until particular issues or issues of a particular type are resolved.

Figure 25:
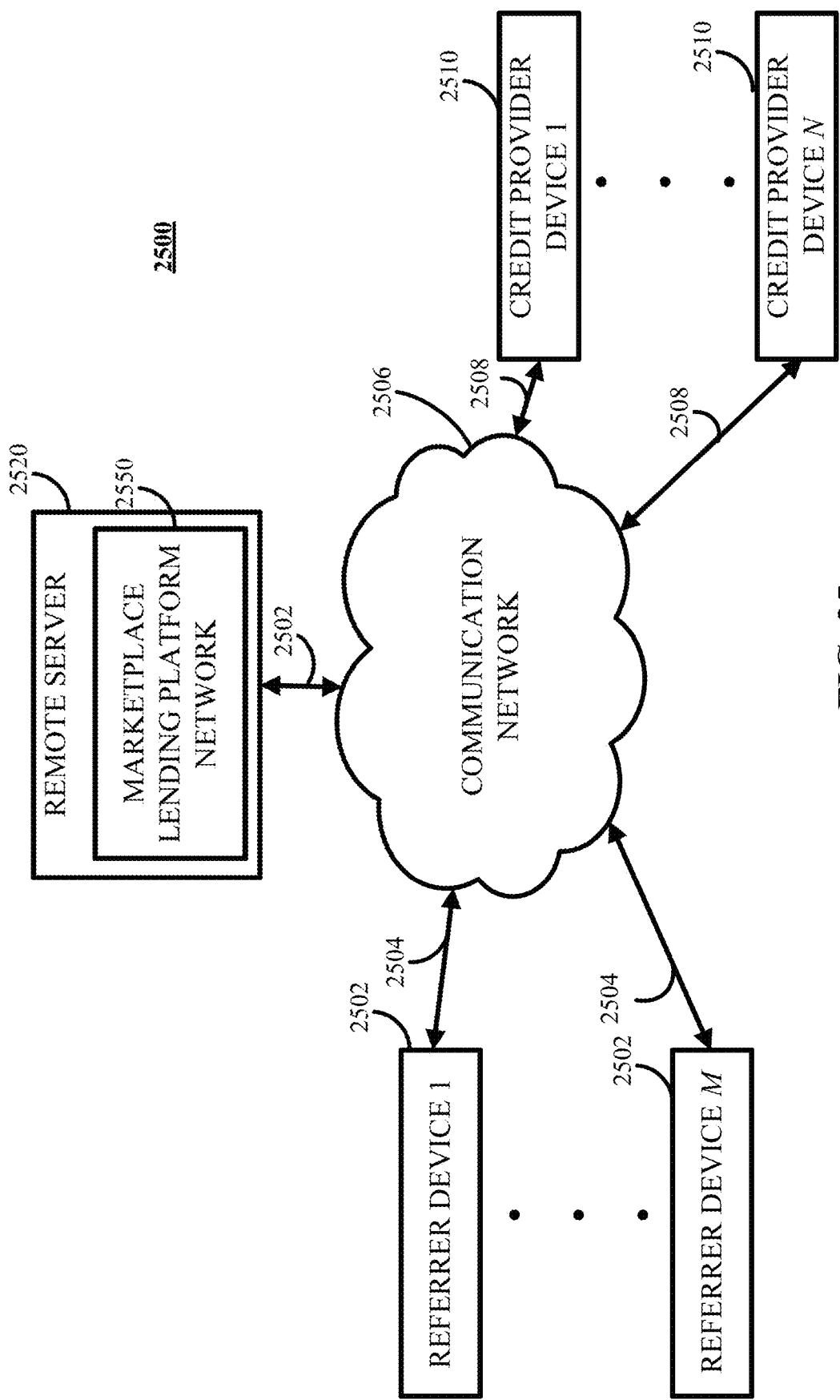
FIG. 25 shows an illustrative example of a generalized schematic diagram of a system on which the mechanisms for providing a networking platform for dynamically aggregating and routing loan inquiries as described herein can be implemented in accordance with some embodiments of the disclosed subject matter.

Turning to FIG. 25, FIG. 25 shows an example 2500 of a generalized schematic diagram of a system on which the mechanisms for providing a marketplace lending network platform that connects referrer devices and credit provider devices as described herein can be implemented in accordance with some embodiments of the disclosed subject matter. As illustrated, system 2500 can include one or more referrer devices 2502. Referrer devices 2502 can be local to each other or remote from each other. Referrer devices 2502 can be connected by one or more communications links 2504 to a communication network 2506 that can be linked to a server 2520 via a communications link 2512.

Although two referrer devices 2502 are shown in FIG. 25 to avoid over-complicating the drawing, any suitable number of these devices, and any suitable types of these devices, can be used in some embodiments. For example, FIG. 25 indicates that referrer devices 1 through M can be connected to system 2500.

System 2500 can include one or more credit provider devices 2510. Credit provider devices 2510 can be local to each other or remote from each other. Credit provider devices 2510 can be connected by one or more communications links 2508 to communication network 2506 that can be linked to server 2520 via communications link 2512 and/or referrer devices 2502 via communications link 2504.

System 2500 can include one or more servers 2520. Server 2520 can be any suitable server or servers for providing access to the mechanisms described herein for providing a marketplace lending network platform that connects referrers and credit providers, such as a processor, a computer, a data processing device, or any suitable combination of such devices. For example, the mechanisms for providing a marketplace lending network platform can be distributed into multiple backend components and multiple frontend components and/or user interfaces. In a more particular example, backend components, such as mechanisms for receiving referred loan inquiries (e.g., through an application programming interface), receiving credit provider information, obtaining supplemental credit information based on borrower identity, storing information relating to referred loan inquiries, intelligently determining, filtering, and/or routing loan inquiries to particular credit providers, storing information relating to network partners, calculating basis points and other scores, etc., can be performed on one or more servers 2520. In another particular example, frontend components, such as mechanisms for presenting user interfaces to users of the marketplace lending network platform, presenting user interfaces for inputting loan inquiry information, identifying credit providers for transmitting a referred loan inquiry, presenting loan offer information on one or more referrer devices 2502 and/or credit provider devices 2510, etc., can be performed on one or more servers 2520.

Figure 26:
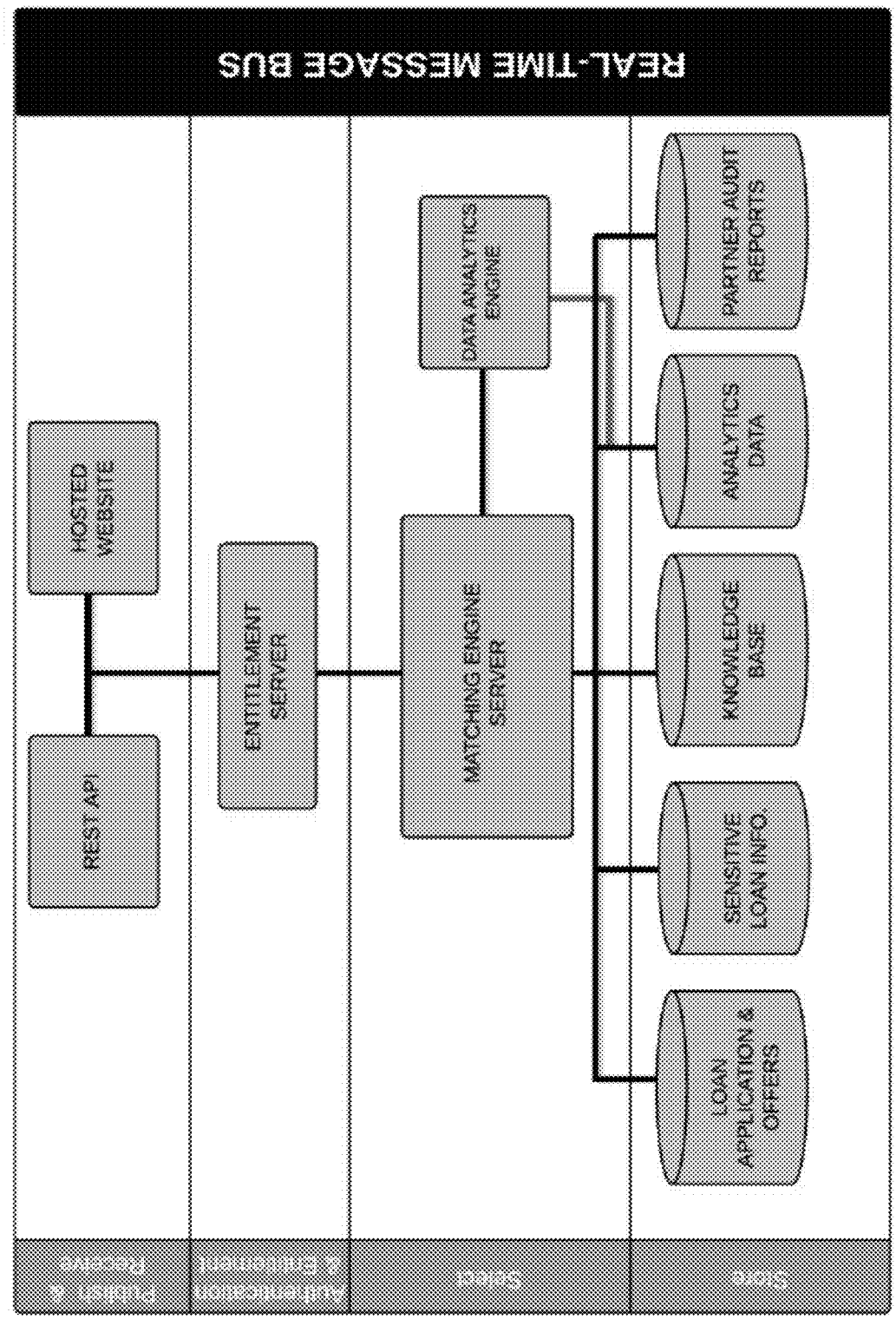
FIG. 26 shows an illustrative example of an architecture for the system on which the mechanisms for providing a marketplace lending network platform as described herein can be implemented in accordance with some embodiments of the disclosed subject matter.

For example, FIG. 26 shows an illustrative architecture for system 2500 in accordance with some embodiments of the disclosed subject matter. As shown, server 2520 can include an entitlement server, a matching engine server, and a data analytics engine. As also shown, server 2520 can include multiple databases that store loan inquiries and offers, sensitive loan information, a knowledge base of marketplace lending network platform information, analytics data used for matching loan inquiries with particular credit providers for potential loan offers, and partner audit reporting information.

In some embodiments, each of referrer devices 2502, credit provider devices 2510, and server 2520 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, referrer device 2502 and/or credit provider device 2510 can be implemented as a smartphone, a tablet computer, a wearable computer, a laptop computer, a portable game console, any other suitable computing device, or any suitable combination thereof.

Communications network 2506 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, one or more peer-to-peer connections, etc. Each of communications links 2504, 2508, and 2512 can be any communications links suitable for communicating data among referrer devices 2502, credit provider devices 2510, and server 2520, such as network links, dial-up links, wireless links, hardwired links, any other suitable communications links, or any suitable combination of such links. Note that, in some embodiments, multiple servers 2520 can be used to provide access to different mechanisms associated with the mechanisms described herein for providing a marketplace lending network platform.

In situations in which the systems described herein collect personal information about borrowers, or make use of personal information, the borrowers or the referrer devices that are referring loan inquiries from one or more borrowers may be provided with an opportunity to control whether programs or features collect borrower information (e.g., information about a borrower's profession, a borrower's preferences, or a borrower's current location). In addition, certain data may be treated in one or more ways before it is stored or used, so that personal information is removed. For example, borrower information and other information that can identify the borrower may be treated so that no personal information can be determined for the borrower. Thus, the borrower or an entity representing the borrower may have control over how information is collected about the borrower and used by a server.

In some embodiments, information stored in a loan inquiry information database can be stored such that personal information of a borrower is obscured. For example, borrower identifying information can be an assigned identification number and/or code name and other loan inquiry information and borrower preferences can be associated with such an identification number and/or code name.

Figure 27:
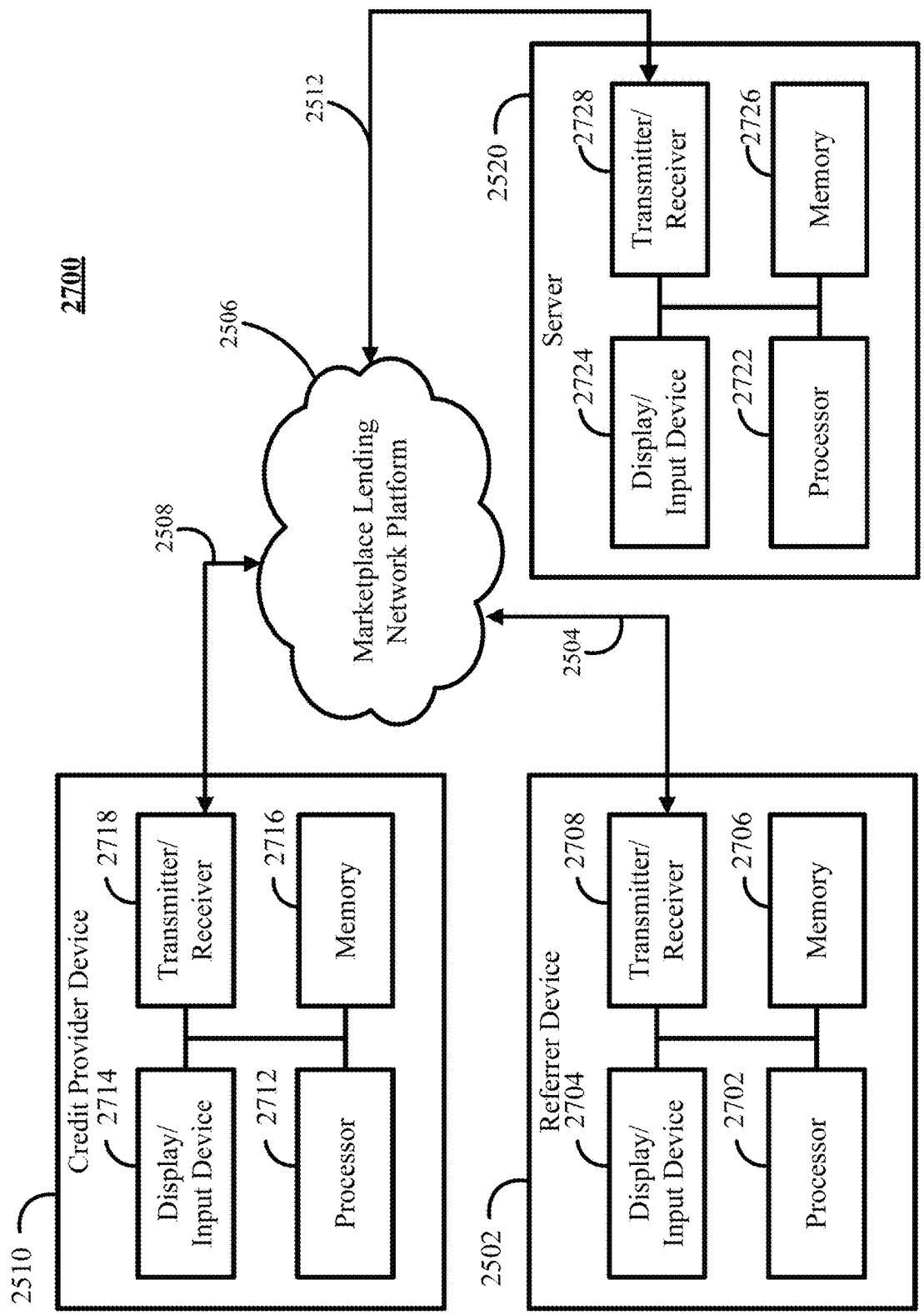
FIG. 27 shows an example of hardware that can be used to implement one or more referrer devices, credit provider devices, and servers depicted in FIG. 25 in accordance with some embodiments of the disclosed subject matter.

FIG. 27 shows an example 2700 of hardware that can be used to implement one or more of referrer devices 2502, credit provider devices 2510, and servers 2520 depicted in FIG. 25 in accordance with some embodiments of the disclosed subject matter. Referring to FIG. 27, referrer device 2502 can include a hardware processor 2702, a display/input device 2704, memory 2706 and a transmitter/receiver 2708, which can be interconnected. In some embodiments, memory 2706 can include a storage device (such as a computer-readable medium) for storing a user device program for controlling hardware processor 2702.

Hardware processor 2702 can use the user device program to execute and/or interact with the mechanisms described herein for providing a marketplace lending network platform, providing loan inquiry information, receiving loan offers from one or more credit providers associated with a loan inquiry, etc. In some embodiments, the user device program can cause hardware processor 2702 to, for example, interact with a device executing at least a portion of the processes as described above. In some embodiments, hardware processor 2702 can send and receive data through communications link 2504 or any other communication links using, for example, a transmitter, a receiver, a transmitter/receiver, a transceiver, or any other suitable communication device, such as transmitter/receiver 2708. Display/input device 2704 can include a touchscreen, a flat panel display, a cathode ray tube display, a projector, a speaker or speakers, and/or any other suitable display, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 2708 can include any suitable transmitter and/or receiver for transmitting and/or receiving, among other things, instructions for submitting loan inquiry information, etc., and can include any suitable hardware, firmware and/or software for interfacing with one or more communication networks, such as network 2506 shown in FIG. 25. For example, transmitter/receiver 2708 can include network interface card circuitry, wireless communication circuitry, and/or any other suitable type of communication network circuitry, one or more antennas, and/or any other suitable hardware, firmware and/or software for transmitting and/or receiving signals.

Credit borrower device 2510 can include a hardware processor 2712, a display/input device 2714, memory 2716 and a transmitter/receiver 2718, which can be interconnected. In some embodiments, memory 2716 can include a storage device (such as a computer-readable medium) for storing a credit provider device program for controlling hardware processor 2712.

Hardware processor 2712 can use the credit provider device program to execute and/or interact with the mechanisms described herein for providing a marketplace lending network platform, receiving credit provider preferences, calculating basis points, presenting user interfaces with aggregated loan inquiry information and other suitable loan-related metrics, etc. In some embodiments, the credit provider device program can cause hardware processor 2712 to, for example, interact with a device executing at least a portion of processes as described above. In some embodiments, hardware processor 2712 can send and receive data through communications link 2508 or any other communication links using, for example, a transmitter, a receiver, a transmitter/receiver, a transceiver, or any other suitable communication device, such as transmitter/receiver 2718. Display/input device 2714 can include a touchscreen, a flat panel display, a cathode ray tube display, a projector, a speaker or speakers, and/or any other suitable display, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 2718 can include any suitable transmitter and/or receiver for transmitting and/or receiving, among other things, requests for interfaces to be presented, requests to submit a loan offer, etc., and can include any suitable hardware, firmware and/or software for interfacing with one or more communication networks, such as network 2506 shown in FIG. 1. For example, transmitter/receiver 2718 can include network interface card circuitry, wireless communication circuitry, USB input and/or output circuitry, HDMI input and/or output circuitry, and/or any other suitable type of communication network circuitry, one or more antennas, and/or any other suitable hardware, firmware and/or software for transmitting and/or receiving signals.

Server 2520 can include a hardware processor 2722, a display/input device 2724, memory 2726 and a transmitter/receiver 2728, which can be interconnected. In some embodiments, memory 2728 can include a storage device for storing data received through communications link 2512 or through other links. The storage device can further include a server program for controlling hardware processor 2722. In some embodiments, memory 2728 can include information stored as a result of referrer device activity and/or credit provider device activity (e.g., loan inquiry information, loan offer information, borrower preferences, credit provider preferences, borrower identifying information, credit provider information, supplemental credit information from credit agencies, etc.). In some embodiments, the server program can cause hardware processor 2722 to, for example, execute at least a portion of the processes described above.

Hardware processor 2722 can use the server program to communicate with referrer devices 2502 and/or credit provider devices 2510 as well as provide access to and/or copies of the mechanisms described herein. It should also be noted that data received through communications link 2512 or any other communications links can be received from any suitable source. In some embodiments, hardware processor 2722 can send and receive data through communications link 2512 or any other communications links using, for example, a transmitter, a receiver, a transmitter/receiver, a transceiver, or any other suitable communication device, such as transmitter/receiver 2728. In some embodiments, hardware processor 2722 can receive commands and/or values transmitted by one or more referrer devices 2502, credit provider device 2510, one or more other servers 2520, and/or one or more users of server 2520, such as a user that makes changes to adjust settings associated with the mechanisms described herein for providing a marketplace lending network platform. Display 2724 can include a touchscreen, a flat panel display, a cathode ray tube display, a projector, a speaker or speakers, and/or any other suitable display, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 2728 can include any suitable transmitter and/or receiver for transmitting and/or receiving, among other things, loan inquiry information to credit provider devices, loan offers to referrer devices, borrower identifying information to credit agency devices, user interfaces for loan process information, user interfaces for aggregated lending information, etc., and can include any suitable hardware, firmware and/or software for interfacing with one or more communication networks, such as network 2506 shown in FIG. 1. For example, transmitter/receiver 2728 can include network interface card circuitry, wireless communication circuitry, and/or any other suitable type of communication network circuitry, one or more antennas, and/or any other suitable hardware, firmware and/or software for transmitting and/or receiving signals.

In some embodiments, server 2520 can be implemented in one server or can be distributed as any suitable number of servers. For example, multiple servers 2520 can be implemented in various locations to increase reliability and/or increase the speed at which the server can communicate with referrer devices 2502 and/or credit provider device 2510. Additionally or alternatively, as described above in connection with FIG. 1, multiple servers 2520 can be implemented to perform different tasks associated with the mechanisms described herein.

In some embodiments, at least some of the above described blocks of the processes of FIGS. 1-5, 9, and 10 can be executed or performed in any order or sequence not limited to the order and sequence shown in and described in connection with the figures. Also, some of the above blocks of FIGS. 1-5, 9, and 10 can be executed or performed substantially simultaneously where appropriate or in parallel to reduce latency and processing times. Additionally or alternatively, some of the above described blocks of the processes of FIGS. 1-5, 9, and 10 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for providing a networking platform for dynamically aggregating and routing loan inquiries are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for connecting banks, member associations, retailers, and others to marketplace and other lenders, the method comprising:

transmitting, using a marketplace lending server, a referrer application programming interface to a plurality of referrer devices, wherein the referrer application programming interface provides an interface between a referrer device and the marketplace lending server and allows the referrer device to transmit a plurality of loan inquiries from potential borrowers for matching with one or more credit providers;

receiving, using a marketplace lending server and from the plurality of referrer devices, a plurality of referred loan inquiries over a channel via the application programming interface, wherein each of the plurality of referred loan inquiries includes a plurality of borrower attributes, and wherein each of the plurality of referred loan inquiries has a loan type;

obscuring, using the marketplace lending server, the plurality of borrower attributes associated with each of the plurality of referred loan inquiries by removing personal information from each of the plurality of referred loan inquiries and replacing the removed personal information with an assigned identification number to each of the plurality of referred loan inquiries;

transmitting, using the marketplace lending server, a credit provider application programming interface to a plurality of credit providers;

obtaining, using the marketplace lending server and from a network that connects a plurality of referrers with a plurality of credit providers, credit provider information associated with the plurality of credit providers via the credit provider application programming interface, wherein obtaining the credit provider information includes using an entitlement engine to determine relationship information between each referrer of the plurality of referrers and each credit provider of the plurality of credit providers;

determining, using the marketplace lending server for each of the plurality of referred loan inquiries, a first set of credit provider devices from a plurality of credit provider devices, wherein determining the first set of credit provider devices includes using a data analytics engine to identify a first set of credit providers associated with the first set of credit provider devices based at least in part on the relationship information between each referrer of the plurality of referrers and each credit provider of the plurality of credit providers that was determined by the entitlement engine and borrower experience information of prior lending experiences associated with each credit provider from the plurality of credit providers and each referrer of the plurality of referrers;

determining, using the marketplace lending server from the first set of credit provider devices, a second set of credit provider devices from the network that connects the plurality of referrers with the plurality of credit providers based at least in part on the loan type associated with a referred loan inquiry from the plurality of referred loan inquiries and information relating to the referred loan inquiry;

determining, using the marketplace lending server, whether a credit provider device in the second set of credit provider devices has associated one or more application programming interfaces to receive and display the referred loan inquiry;

in response to determining that the credit provider device in the second set of credit provider devices is not associated the one or more application programming interfaces to receive and display the referred loan inquiry, transmitting, using the marketplace lending server, a referral application programming interface that is capable of receiving and displaying the referred loan inquiry to the credit provider device;

transmitting, using the marketplace lending server, the referred loan inquiry to the second set of credit provider devices, wherein the referral application programming interface executing on the credit provider device receives and displays the information relating to the referred loan inquiry on the credit provider device;

continuously retrieving, using the marketplace lending server, a plurality of loan offers from the second set of credit provider devices, wherein a first loan offer from the plurality of loan offers is retrieved from a first credit provider device at a first time and a second loan offer from the plurality of loan offers is retrieved from a second credit provider device at a second time; and transmitting, using the marketplace lending server, the plurality of loan offers that includes the first loan offer and the second loan offer to a referrer device associated with the referred loan inquiry from the plurality of referrer devices.

2. The method of claim 1, wherein the credit provider information includes borrower eligibility criteria and wherein the method further comprises:

selecting the first set of credit provider devices from the plurality of credit provider devices by determining whether the borrower information associated with the borrower in the referred loan inquiry meets the borrower eligibility criteria associated with a credit provider device.

3. The method of claim 1, further comprising routing a referred loan inquiry to a credit provider device from the second set of credit provider devices by:

generating an encoded loan inquiry using a cryptographic protocol to encode the referred loan inquiry; and transmitting the encoded loan inquiry to the credit provider device, wherein the credit provider device has a key for decoding the encoded loan inquiry.

4. The method of claim 1, wherein a referred loan inquiry is at least one of: a consumer loan inquiry, a student loan inquiry, a small business loan inquiry, a real estate loan inquiry, and an automobile loan inquiry.

5. The method of claim 1, wherein the network includes at least a plurality of: banks, associations, retailers, marketplace lenders, asset managers, securitization originators, and investors.

6. The method of claim 1, wherein transmitting the referred loan inquiry to the second set of credit provider devices further comprises:

determining whether each credit provider device from the second set of credit provider devices has received the referred loan inquiry;

in response to determining that at least one credit provider device in the second set of credit provider devices has not received the referred loan inquiry, transmitting a request to the at least one credit provider device to obtain the referral application programming interface that is capable of receiving and displaying the referred loan inquiry; and providing the referral application programming interface based on a response to the request.

7. The method of claim 1, further comprising:
receiving loan inquiry status information from the second set of credit provider devices, wherein a first credit provider device transmits the loan inquiry status information using the credit provider application programming interface and a second credit provider device transmits the loan inquiry status information using a provided reporting application programming interface;
normalizing the received loan inquiry status information; and
transmitting updates to a plurality of referral partner devices, wherein each of the plurality of referral partner devices is associated with one of a plurality of interfaces for receiving the updates in connection with loan inquiry status information.

8. A system for connecting banks, member associations, retailers, and others to marketplace and other lenders, the system comprising:
a hardware processor that is configured to:
transmit a referrer application programming interface to a plurality of referrer devices, wherein the referrer application programming interface provides an interface between a referrer device and the marketplace lending server and allows the referrer device to transmit a plurality of loan inquiries from potential borrowers for matching with one or more credit providers;
receive, from the plurality of referrer devices, a plurality of referred loan inquiries over a channel via the application programming interface, wherein each of the plurality of referred loan inquiries includes a plurality of borrower attributes, and wherein each of the plurality of referred loan inquiries has a loan type;
obscure the plurality of borrower attributes associated with each of the plurality of referred loan inquiries by removing personal information from each of the plurality of referred loan inquiries and replacing the removed personal information with an assigned identification number to each of the plurality of referred loan inquiries;
transmit a credit provider application programming interface to a plurality of credit providers;
obtain, from a network that connects a plurality of referrers with a plurality of credit providers, credit provider information associated with the plurality of credit providers via the credit provider application programming interface, wherein obtaining the credit provider information includes using an entitlement engine to determine relationship information between each referrer of the plurality of referrers and each credit provider of the plurality of credit providers;
determine, for each of the plurality of referred loan inquiries, a first set of credit provider devices from a plurality of credit provider devices, wherein determining the first set of credit provider devices includes using a data analytics engine to identify a first set of credit providers associated with the first set of credit provider devices based at least in part on the relationship information between each referrer of the plurality of referrers and each credit provider of the plurality of credit providers that was determined by the entitlement engine and borrower experience information of prior lending experiences associated with each credit provider from the plurality of credit providers and each referrer of the plurality of referrers;
determine, from the first set of credit provider devices, a second set of credit provider devices from the network that connects the plurality of referrers with the plurality of credit providers based at least in part on the loan type associated with a referred loan inquiry from the plurality of referred loan inquiries and information relating to the referred loan inquiry;
determine whether a credit provider device in the second set of credit provider devices has associated one or more application programming interfaces to receive and display the referred loan inquiry;
in response to determining that the credit provider device in the second set of credit provider devices is not associated the one or more application programming interfaces to receive and display the referred loan inquiry, transmit a referral application programming interface that is capable of receiving and displaying the referred loan inquiry to the credit provider device;
transmit the referred loan inquiry to the second set of credit provider devices, wherein the referral application programming interface executing on the at least one credit provider device receives and displays the information relating to the referred loan inquiry on the credit provider device;
continuously retrieve a plurality of loan offers from the second set of credit provider devices, wherein a first loan offer from the plurality of loan offers is retrieved from a first credit provider device at a first time and a second loan offer from the plurality of loan offers is retrieved from a second credit provider device at a second time; and
transmit the plurality of loan offers that includes the first loan offer and the second loan offer to a referrer device associated with the referred loan inquiry from the plurality of referrer devices.

9. The system of claim 8, wherein the credit provider information includes borrower eligibility criteria and wherein the hardware processor is further configured to:
select the first set of credit provider devices from the plurality of credit provider devices by determining whether the borrower information associated with the borrower in the referred loan inquiry meets the borrower eligibility criteria associated with a credit provider device.

10. The system of claim 8, wherein the hardware processor is further configured to route a referred loan inquiry to a credit provider device from the second set of credit provider devices by:
generating an encoded loan inquiry using a cryptographic protocol to encode the referred loan inquiry; and
transmitting the encoded loan inquiry to the credit provider device, wherein the credit provider device has a key for decoding the encoded loan inquiry.

11. The system of claim 8, wherein a referred loan inquiry is at least one of: a consumer loan inquiry, a student loan inquiry, a small business loan inquiry, a real estate loan inquiry, and an automobile loan inquiry.

12. The system of claim 8, wherein the network includes at least a plurality of: banks, associations, retailers, marketplace lenders, asset managers, securitization originators, and investors.

13. The system of claim 8, wherein transmitting the referred loan inquiry to the second set of credit provider devices further comprises:
- determining whether each credit provider device from the second set of credit provider devices has received the referred loan inquiry;
- in response to determining that at least one credit provider device in the second set of credit provider devices has not received the referred loan inquiry, transmitting a request to the at least one credit provider device to obtain the referral application programming interface that is capable of receiving and displaying the referred loan inquiry; and
- providing the referral application programming interface based on a response to the request.

14. The system of claim 8, wherein the hardware processor is further configured to:
- receive loan inquiry status information from the second set of credit provider devices, wherein a first credit provider device transmits the loan inquiry status information using the credit provider application programming interface and a second credit provider device transmits the loan inquiry status information using a provided reporting application programming interface;
- normalize the received loan inquiry status information; and
- transmit updates to a plurality of referral partner devices, wherein each of the plurality of referral partner devices is associated with one of a plurality of interfaces for receiving the updates in connection with loan inquiry status information.

* * * * *